(12) United States Patent
To et al.

(10) Patent No.: US 9,356,267 B1
(45) Date of Patent: May 31, 2016

(54) PROTECTIVE BATTERY CASE TO PARTIALLY ENCLOSE A MOBILE ELECTRONIC DEVICE

(71) Applicant: Mophie, Inc., Tustin, CA (US)

(72) Inventors: Nguyen To, Corona, CA (US); Erik John Gjøvik, Aliso Viejo, CA (US)

(73) Assignee: mophie, inc., Tustin, CA (US)

( * ) Notice: Subject to any disclaimer, the term of this patent is extended or adjusted under 35 U.S.C. 154(b) by 0 days.

(21) Appl. No.: 14/675,067

(22) Filed: Mar. 31, 2015

Related U.S. Application Data

(60) Provisional application No. 62/093,339, filed on Dec. 17, 2014, provisional application No. 62/130,553, filed on Mar. 9, 2015.

(51) Int. Cl.
  *H01M 2/02* (2006.01)
  *H01M 2/10* (2006.01)
(52) U.S. Cl.
  CPC ........ *H01M 2/1022* (2013.01); *H01M 2220/30* (2013.01)
(58) Field of Classification Search
  CPC .......... H01M 10/425; H01M 10/4257; H01M 2220/30; H01M 2/1066; H01M 2/1022
  See application file for complete search history.

(56) References Cited

U.S. PATENT DOCUMENTS

| | | | |
|---|---|---|---|
| 3,851,126 A | 11/1974 | Keller | |
| 4,028,515 A | 6/1977 | Desio et al. | |
| D267,795 S | 2/1983 | Mallon | |
| 4,479,596 A | 10/1984 | Swanson | |
| 4,515,272 A | 5/1985 | Newhouse | |
| D284,372 S | 6/1986 | Carpenter | |
| 4,951,817 A | 8/1990 | Barletta et al. | |
| D312,534 S | 12/1990 | Nelson et al. | |
| 5,001,772 A | 3/1991 | Holcomb et al. | |
| D322,719 S | 12/1991 | Jayez | |
| D327,868 S | 7/1992 | Oka | |

(Continued)

FOREIGN PATENT DOCUMENTS

| | | |
|---|---|---|
| CN | 201252577 Y | 6/2009 |
| CN | 202364273 U | 8/2012 |

(Continued)

OTHER PUBLICATIONS

U.S. Appl. No. 14/800,530, filed Jul. 15, 2015, Huang, Including its prosecution history.

(Continued)

*Primary Examiner* — Rena L Dye
(74) *Attorney, Agent, or Firm* — Knobbe, Martens, Olson & Bear, LLP

(57) ABSTRACT

A protective battery case for use with a mobile electronic device can include a back wall, a right side wall, a left side wall, a bottom wall, and a top wall. The protective battery case can include a battery, which can be disposed in the back wall. A device interface can be configured to engage a corresponding interface on the mobile electronic device to deliver electrical power from the battery to the mobile electronic device. A charging interface can be configured to receive electrical power for charging the battery. The protective battery case can include one or more bumpers disposed on the inside of the protective battery case such that the one or more bumpers abut against sides of the mobile electronic device to provide cushioning and/or shock absorption to protect the mobile electronic device.

21 Claims, 13 Drawing Sheets

(56) References Cited

U.S. PATENT DOCUMENTS

| | | |
|---|---|---|
| 5,360,108 A | 11/1994 | Alagia |
| 5,368,159 A | 11/1994 | Doria |
| 5,383,091 A | 1/1995 | Snell |
| 5,386,084 A | 1/1995 | Risko |
| 5,508,123 A | 4/1996 | Fan |
| D372,896 S | 8/1996 | Nagele et al. |
| 5,586,002 A | 12/1996 | Notarianni |
| 5,604,050 A | 2/1997 | Brunette et al. |
| 5,610,979 A | 3/1997 | Yu |
| D384,327 S | 9/1997 | Nakui |
| 5,708,707 A | 1/1998 | Halttlunen et al. |
| 5,711,013 A | 1/1998 | Collett et al. |
| D392,248 S | 3/1998 | Johansson |
| D392,939 S | 3/1998 | Finke-Anlauff |
| 5,786,106 A | 7/1998 | Armani |
| 5,816,459 A | 10/1998 | Armistead |
| D400,495 S | 11/1998 | Deslyper et al. |
| D400,496 S | 11/1998 | Barber et al. |
| 5,859,481 A | 1/1999 | Banyas |
| 5,864,766 A | 1/1999 | Chiang |
| D405,801 S | 2/1999 | Nagele et al. |
| D407,063 S | 3/1999 | Reis et al. |
| 5,876,351 A | 3/1999 | Rohde |
| D407,708 S | 4/1999 | Nagele et al. |
| 5,896,277 A | 4/1999 | Leon et al. |
| 5,932,855 A | 8/1999 | Wang et al. |
| 5,959,433 A | 9/1999 | Rohde |
| 5,973,477 A | 10/1999 | Chang |
| D417,189 S | 11/1999 | Amero, Jr. et al. |
| 6,043,626 A | 3/2000 | Snyder et al. |
| D424,512 S | 5/2000 | Ho |
| 6,069,332 A | 5/2000 | Suchanek et al. |
| 6,081,595 A | 6/2000 | Picaud |
| D428,019 S | 7/2000 | Amron |
| 6,082,535 A | 7/2000 | Mitchell |
| 6,171,138 B1 | 1/2001 | Lefebvre et al. |
| D438,004 S | 2/2001 | Watson et al. |
| 6,184,654 B1 | 2/2001 | Bachner, III et al. |
| D439,218 S | 3/2001 | Yu |
| 6,201,867 B1 | 3/2001 | Koike |
| 6,208,115 B1 | 3/2001 | Binder |
| 6,266,539 B1 | 7/2001 | Pardo |
| D446,497 S | 8/2001 | Yu |
| 6,273,252 B1 | 8/2001 | Mitchell |
| D447,462 S | 9/2001 | Kosiba |
| 6,313,982 B1 | 11/2001 | Hino |
| 6,317,313 B1 | 11/2001 | Mosgrove et al. |
| 6,324,380 B1 | 11/2001 | Kiuchi et al. |
| 6,346,791 B1 | 2/2002 | Barguirdjian |
| 6,405,056 B1 | 6/2002 | Altschul et al. |
| D460,411 S | 7/2002 | Wang |
| D460,761 S | 7/2002 | Croley |
| 6,415,138 B2 | 7/2002 | Sirola et al. |
| 6,445,577 B1 | 9/2002 | Madsen et al. |
| 6,471,056 B1 | 10/2002 | Tzeng |
| D469,427 S | 1/2003 | Ma et al. |
| 6,536,589 B2 | 3/2003 | Chang |
| 6,538,413 B1 | 3/2003 | Beard et al. |
| D472,384 S | 4/2003 | Richardson |
| 6,552,513 B1 | 4/2003 | Li |
| 6,555,990 B1 | 4/2003 | Yang |
| 6,583,601 B2 | 6/2003 | Simoes et al. |
| 6,594,472 B1 | 7/2003 | Curtis et al. |
| 6,614,722 B2 | 9/2003 | Polany et al. |
| 6,626,362 B1 | 9/2003 | Steiner et al. |
| D481,716 S | 11/2003 | He et al. |
| D482,529 S | 11/2003 | Hardigg et al. |
| 6,646,864 B2 | 11/2003 | Richardson |
| D484,874 S | 1/2004 | Chang et al. |
| D485,834 S | 1/2004 | Davetas |
| 6,681,003 B2 | 1/2004 | Linder et al. |
| 6,701,159 B1 | 3/2004 | Powell |
| 6,708,887 B1 | 3/2004 | Garrett et al. |
| 6,714,802 B1 | 3/2004 | Barvesten |
| 6,785,566 B1 | 8/2004 | Irizarry |
| 6,819,549 B1 | 11/2004 | Lammers-Meis et al. |
| D500,041 S | 12/2004 | Tsujimoto |
| D506,612 S | 6/2005 | Rosa et al. |
| D508,495 S | 8/2005 | Bone et al. |
| D513,123 S | 12/2005 | Richardson et al. |
| 6,980,777 B2 | 12/2005 | Shepherd et al. |
| D513,451 S | 1/2006 | Richardson et al. |
| 6,992,461 B2 | 1/2006 | Liang et al. |
| D514,808 S | 2/2006 | Morine et al. |
| D516,309 S | 3/2006 | Richardson et al. |
| D516,553 S | 3/2006 | Richardson et al. |
| D516,554 S | 3/2006 | Richardson et al. |
| D516,807 S | 3/2006 | Richardson et al. |
| D517,007 S | 3/2006 | Yong-Jian et al. |
| D520,744 S | 5/2006 | Pangrec et al. |
| 7,050,841 B1 | 5/2006 | Onda |
| 7,069,063 B2 | 6/2006 | Halkosaari et al. |
| D525,582 S | 7/2006 | Chan |
| 7,072,699 B2 | 7/2006 | Eiden |
| 7,079,879 B1 | 7/2006 | Sylvester et al. |
| 7,081,736 B2 | 7/2006 | Seil et al. |
| D526,780 S | 8/2006 | Richardson et al. |
| D526,958 S | 8/2006 | Shimizu |
| D530,079 S | 10/2006 | Thomas et al. |
| D535,252 S | 1/2007 | Sandnes |
| 7,158,376 B2 | 1/2007 | Richardson et al. |
| 7,166,987 B2 | 1/2007 | Lee et al. |
| D537,063 S | 2/2007 | Kim et al. |
| 7,180,735 B2 | 2/2007 | Thomas et al. |
| 7,180,754 B2 | 2/2007 | Qin et al. |
| 7,194,291 B2 | 3/2007 | Peng |
| D540,539 S | 4/2007 | Gutierrez |
| 7,203,467 B2 | 4/2007 | Siddiqui |
| D542,286 S | 5/2007 | Taniyama et al. |
| D542,524 S | 5/2007 | Richardson et al. |
| D543,541 S | 5/2007 | Chung et al. |
| D544,486 S | 6/2007 | Hussaini et al. |
| 7,230,823 B2 | 6/2007 | Richardson et al. |
| D547,056 S | 7/2007 | Griffin et al. |
| D547,057 S | 7/2007 | Griffin et al. |
| D550,455 S | 9/2007 | Barnhart |
| D551,252 S | 9/2007 | Andre et al. |
| 7,266,391 B2 | 9/2007 | Warren |
| D551,856 S | 10/2007 | Ko et al. |
| D553,857 S | 10/2007 | Pendergraph et al. |
| D556,679 S | 12/2007 | Weinstein et al. |
| D556,681 S | 12/2007 | Kim |
| D557,205 S | 12/2007 | Kim |
| D557,264 S | 12/2007 | Richardson et al. |
| D557,494 S | 12/2007 | Mayette et al. |
| D557,897 S | 12/2007 | Richardson et al. |
| 7,312,984 B2 | 12/2007 | Richardson et al. |
| D558,667 S | 1/2008 | Park et al. |
| D558,757 S | 1/2008 | Andre et al. |
| D558,972 S | 1/2008 | Oh |
| D558,973 S | 1/2008 | Hussaini et al. |
| D559,267 S | 1/2008 | Griffin |
| D560,229 S | 1/2008 | Yagi |
| D561,092 S | 2/2008 | Kim |
| 7,336,973 B2 | 2/2008 | Goldthwaite et al. |
| D563,093 S | 3/2008 | Nussberger |
| 7,343,184 B2 | 3/2008 | Rostami |
| D565,291 S | 4/2008 | Brandenburg et al. |
| 7,397,658 B2 | 7/2008 | Finke-Anlauff et al. |
| 7,400,917 B2 | 7/2008 | Wood et al. |
| D574,326 S | 8/2008 | Lim |
| D574,819 S | 8/2008 | Andre et al. |
| D575,056 S | 8/2008 | Tan |
| 7,428,427 B2 | 9/2008 | Brunstrom et al. |
| D577,904 S | 10/2008 | Sasaki |
| D581,151 S | 11/2008 | Aipa |
| D581,155 S | 11/2008 | Richardson et al. |
| D581,421 S | 11/2008 | Richardson et al. |
| D582,149 S | 12/2008 | Tan |
| 7,464,814 B2 | 12/2008 | Carnevali |
| D584,732 S | 1/2009 | Cho et al. |
| 7,479,759 B2 | 1/2009 | Vilanov et al. |
| D587,008 S | 2/2009 | Richardson et al. |
| D587,896 S | 3/2009 | Aipa |

(56) References Cited

U.S. PATENT DOCUMENTS

| | | |
|---|---|---|
| D589,016 S | 3/2009 | Richardson et al. |
| 7,536,099 B2 | 5/2009 | Dalby et al. |
| D593,319 S | 6/2009 | Richardson et al. |
| D593,746 S | 6/2009 | Richardson et al. |
| D594,849 S | 6/2009 | Ko |
| 7,555,325 B2 | 6/2009 | Goros |
| D597,089 S | 7/2009 | Khan et al. |
| 7,562,813 B2 | 7/2009 | Humphrey et al. |
| D597,301 S | 8/2009 | Richardson et al. |
| D598,407 S | 8/2009 | Richardson et al. |
| 7,577,462 B2 | 8/2009 | Kumar |
| D600,640 S | 9/2009 | Stein et al. |
| D600,908 S | 9/2009 | Richardson et al. |
| D601,955 S | 10/2009 | Ekmekdje |
| D601,959 S | 10/2009 | Lee et al. |
| D601,960 S | 10/2009 | Dai |
| 7,609,512 B2 | 10/2009 | Richardson et al. |
| D603,602 S | 11/2009 | Richardson et al. |
| D603,603 S | 11/2009 | Laine et al. |
| 7,612,997 B1 | 11/2009 | Diebel et al. |
| D605,850 S | 12/2009 | Richardson et al. |
| D606,528 S | 12/2009 | Khan et al. |
| D606,529 S | 12/2009 | Ferrari et al. |
| 7,635,086 B2 | 12/2009 | Spencer, II |
| 7,638,969 B2 | 12/2009 | Woud |
| 7,647,082 B2 | 1/2010 | Holmberg |
| D609,228 S | 2/2010 | Ferrari et al. |
| D609,463 S | 2/2010 | Bullen |
| D610,538 S | 2/2010 | Wu et al. |
| 7,656,120 B2 | 2/2010 | Neu et al. |
| 7,663,878 B2 | 2/2010 | Swan et al. |
| 7,667,433 B1 | 2/2010 | Smith |
| D610,807 S | 3/2010 | Bau |
| D611,042 S | 3/2010 | Ferrari et al. |
| D611,478 S | 3/2010 | Richardson et al. |
| 7,669,829 B2 | 3/2010 | Ogatsu |
| D613,282 S | 4/2010 | Richardson et al. |
| D615,077 S | 5/2010 | Richardson et al. |
| D615,535 S | 5/2010 | Richardson et al. |
| D615,536 S | 5/2010 | Richardson et al. |
| D615,967 S | 5/2010 | Richardson et al. |
| D616,360 S | 5/2010 | Huang |
| D616,361 S | 5/2010 | Huang |
| D617,753 S | 6/2010 | Cheng |
| D617,784 S | 6/2010 | Richardson et al. |
| D617,785 S | 6/2010 | Richardson et al. |
| D617,786 S | 6/2010 | Richardson et al. |
| D617,787 S | 6/2010 | Richardson et al. |
| D618,231 S | 6/2010 | Fahrendorff et al. |
| 7,733,637 B1 | 6/2010 | Lam |
| D619,573 S | 7/2010 | Khan et al. |
| D619,574 S | 7/2010 | Richardson et al. |
| D619,991 S | 7/2010 | Huang |
| D620,000 S | 7/2010 | Bau |
| D620,487 S | 7/2010 | Richardson et al. |
| D621,394 S | 8/2010 | Richardson et al. |
| D621,395 S | 8/2010 | Richardson et al. |
| D621,821 S | 8/2010 | Richardson et al. |
| D621,822 S | 8/2010 | Richardson et al. |
| 7,778,023 B1 | 8/2010 | Mohoney |
| 7,782,610 B2 | 8/2010 | Diebel et al. |
| D623,179 S | 9/2010 | Richardson et al. |
| D623,180 S | 9/2010 | Diebel |
| D623,638 S | 9/2010 | Richardson et al. |
| D623,639 S | 9/2010 | Richardson et al. |
| D623,640 S | 9/2010 | Freeman |
| D624,317 S | 9/2010 | Wenchel et al. |
| D624,533 S | 9/2010 | Richardson et al. |
| D624,908 S | 10/2010 | Huskinson |
| D624,909 S | 10/2010 | Huskinson |
| D624,910 S | 10/2010 | Richardson et al. |
| D625,303 S | 10/2010 | Kim |
| D626,120 S | 10/2010 | Richardson et al. |
| D626,121 S | 10/2010 | Richardson et al. |
| D626,538 S | 11/2010 | Brown et al. |
| D626,539 S | 11/2010 | Brown et al. |
| D626,540 S | 11/2010 | Brown et al. |
| D626,964 S | 11/2010 | Richardson et al. |
| D628,568 S | 12/2010 | Richardson et al. |
| D628,994 S | 12/2010 | Griffin, Jr. et al. |
| 7,859,222 B2 | 12/2010 | Woud |
| D631,246 S | 1/2011 | Boettner |
| 7,863,856 B2 | 1/2011 | Sherman et al. |
| 7,863,862 B2 | 1/2011 | Idzik et al. |
| D631,877 S | 2/2011 | Rak et al. |
| D632,648 S | 2/2011 | Yang |
| D632,683 S | 2/2011 | Richardson et al. |
| D632,684 S | 2/2011 | Richardson et al. |
| D632,685 S | 2/2011 | Richardson et al. |
| D632,686 S | 2/2011 | Magness et al. |
| 7,889,489 B2 | 2/2011 | Richardson et al. |
| 7,889,498 B2 | 2/2011 | Diebel et al. |
| D634,704 S | 3/2011 | Tieleman et al. |
| D634,741 S | 3/2011 | Richardson et al. |
| 7,899,397 B2 | 3/2011 | Kumar |
| 7,907,394 B2 | 3/2011 | Richardson et al. |
| 7,911,530 B2 | 3/2011 | Sawachi |
| D636,386 S | 4/2011 | Richardson et al. |
| D636,387 S | 4/2011 | Willes et al. |
| 7,930,011 B2 | 4/2011 | Shi et al. |
| 7,933,122 B2 | 4/2011 | Richardson et al. |
| D637,588 S | 5/2011 | Richardson et al. |
| D637,589 S | 5/2011 | Willes et al. |
| D637,590 S | 5/2011 | Michie et al. |
| D637,591 S | 5/2011 | Willes et al. |
| D637,592 S | 5/2011 | Magness et al. |
| D637,952 S | 5/2011 | Tan |
| D638,005 S | 5/2011 | Richardson et al. |
| D638,411 S | 5/2011 | Willes et al. |
| D638,413 S | 5/2011 | Magness et al. |
| D638,414 S | 5/2011 | Magness et al. |
| D638,828 S | 5/2011 | Melanson et al. |
| D638,829 S | 5/2011 | Melanson et al. |
| D638,830 S | 5/2011 | Magness et al. |
| D639,731 S | 6/2011 | Sun |
| D640,679 S | 6/2011 | Willes et al. |
| D640,680 S | 6/2011 | Magness et al. |
| 7,957,524 B2 | 6/2011 | Chipping |
| D641,013 S | 7/2011 | Richardson et al. |
| D641,014 S | 7/2011 | Smith et al. |
| D641,974 S | 7/2011 | Stampfli |
| D642,170 S | 7/2011 | Johnson et al. |
| D642,171 S | 7/2011 | Melanson et al. |
| D642,558 S | 8/2011 | Magness |
| D643,029 S | 8/2011 | Feng |
| D643,424 S | 8/2011 | Richardson et al. |
| D644,215 S | 8/2011 | Dong |
| D644,216 S | 8/2011 | Richardson et al. |
| D644,219 S | 8/2011 | Sawada |
| 7,988,010 B2 | 8/2011 | Yang et al. |
| 8,004,962 B2 | 8/2011 | Yang et al. |
| D644,635 S | 9/2011 | Richardson et al. |
| D644,639 S | 9/2011 | Weller et al. |
| D647,084 S | 10/2011 | Fathollahi |
| D647,108 S | 10/2011 | Lee |
| 8,028,794 B1 | 10/2011 | Freeman |
| 8,046,039 B2 | 10/2011 | Lee et al. |
| D648,714 S | 11/2011 | Jones, III et al. |
| D648,715 S | 11/2011 | Jones, III et al. |
| D648,716 S | 11/2011 | Jones, III et al. |
| D648,717 S | 11/2011 | Fahrendorff et al. |
| D649,143 S | 11/2011 | Jones, III et al. |
| D649,539 S | 11/2011 | Hong |
| D650,810 S | 12/2011 | Lemelman et al. |
| D652,827 S | 1/2012 | Fahrendorff et al. |
| D652,828 S | 1/2012 | Fahrendorff et al. |
| D653,202 S | 1/2012 | Hasbrook et al. |
| D653,659 S | 2/2012 | Fahrendorff et al. |
| D654,069 S | 2/2012 | Kwon |
| D654,483 S | 2/2012 | Richardson et al. |
| D654,931 S | 2/2012 | Lemelman et al. |
| D655,281 S | 3/2012 | Turocy |
| D655,699 S | 3/2012 | Bau |
| D656,495 S | 3/2012 | Andre et al. |

(56) References Cited

U.S. PATENT DOCUMENTS

| | | |
|---|---|---|
| D658,165 S | 4/2012 | Freeman |
| 8,150,485 B2 | 4/2012 | Lee |
| D658,643 S | 5/2012 | Fahrendorff et al. |
| 8,167,127 B2 | 5/2012 | Martin et al. |
| D662,923 S | 7/2012 | Piedra et al. |
| D663,263 S | 7/2012 | Gupta et al. |
| D663,319 S | 7/2012 | Chen et al. |
| D664,091 S | 7/2012 | Pliner et al. |
| 8,224,408 B2 | 7/2012 | Tomasini et al. |
| D665,386 S | 8/2012 | Fathollahi |
| D665,735 S | 8/2012 | Kang et al. |
| 8,245,842 B2 | 8/2012 | Bau |
| 8,247,102 B2 | 8/2012 | Hua |
| D667,783 S | 9/2012 | Zhang et al. |
| D670,281 S | 11/2012 | Corpuz et al. |
| D670,689 S | 11/2012 | Wang |
| D671,105 S | 11/2012 | Rothbaum et al. |
| D671,106 S | 11/2012 | Rothbaum et al. |
| D671,493 S | 11/2012 | Hasbrook et al. |
| 8,321,619 B2 | 11/2012 | Kular et al. |
| 8,328,008 B2 | 12/2012 | Diebel et al. |
| D674,394 S | 1/2013 | Kajimoto |
| 8,342,325 B2 | 1/2013 | Rayner |
| D675,603 S | 2/2013 | Melanson et al. |
| D676,032 S | 2/2013 | Stump et al. |
| D676,432 S | 2/2013 | Hasbrook et al. |
| 8,367,235 B2 | 2/2013 | Huang et al. |
| 8,380,264 B2 | 2/2013 | Hung et al. |
| D677,249 S | 3/2013 | Li et al. |
| D678,869 S | 3/2013 | Diebel |
| 8,390,255 B1 | 3/2013 | Fathollahi |
| 8,393,466 B2 | 3/2013 | Rayner |
| D679,271 S | 4/2013 | Liu |
| D679,684 S | 4/2013 | Baker et al. |
| D681,020 S | 4/2013 | Magness et al. |
| D682,196 S | 5/2013 | Leung |
| D682,815 S | 5/2013 | Chang |
| D683,338 S | 5/2013 | Wilson et al. |
| 8,452,242 B2 | 5/2013 | Spencer, II |
| 8,457,701 B2 | 6/2013 | Diebel |
| D685,356 S | 7/2013 | Diebel |
| D686,152 S | 7/2013 | Lee et al. |
| D686,606 S | 7/2013 | Hong |
| 8,483,758 B2 | 7/2013 | Huang |
| D687,426 S | 8/2013 | Requa |
| D688,233 S | 8/2013 | Dong |
| 8,499,933 B2 | 8/2013 | Ziemba |
| 8,505,718 B2 | 8/2013 | Griffin, Jr. et al. |
| 8,509,864 B1 | 8/2013 | Diebel |
| 8,509,865 B1 * | 8/2013 | LaColla et al. ............ 455/575.8 |
| 8,531,833 B2 | 9/2013 | Diebel et al. |
| D691,990 S | 10/2013 | Rayner |
| 8,560,014 B1 | 10/2013 | Hu et al. |
| D693,801 S | 11/2013 | Rayner |
| 8,579,172 B2 | 11/2013 | Monaco et al. |
| D696,234 S | 12/2013 | Wright |
| D697,502 S | 1/2014 | Chu et al. |
| D698,774 S | 2/2014 | Wardy |
| D703,652 S | 4/2014 | Melanson et al. |
| D704,182 S | 5/2014 | Smith |
| D704,688 S | 5/2014 | Reivo et al. |
| D706,255 S | 6/2014 | Akana et al. |
| D706,256 S | 6/2014 | Ward et al. |
| D706,272 S | 6/2014 | Poon |
| D709,058 S | 7/2014 | Hemesath et al. |
| D710,344 S | 8/2014 | Smith et al. |
| D710,795 S | 8/2014 | Gupta et al. |
| D710,839 S | 8/2014 | Chang |
| D711,312 S | 8/2014 | Tien |
| D711,362 S | 8/2014 | Poon |
| D711,863 S | 8/2014 | Wen |
| D714,278 S | 9/2014 | Case et al. |
| D716,784 S | 11/2014 | Wen |
| D716,785 S | 11/2014 | White |
| 8,917,506 B2 | 12/2014 | Diebel et al. |
| D721,356 S | 1/2015 | Hasbrook et al. |
| D721,685 S | 1/2015 | Hasbrook et al. |
| D721,687 S | 1/2015 | To et al. |
| 8,954,117 B2 | 2/2015 | Huang |
| D723,530 S | 3/2015 | Namminga et al. |
| 8,971,039 B2 | 3/2015 | Huang et al. |
| D727,883 S | 4/2015 | Brand et al. |
| 9,026,187 B2 | 5/2015 | Huang |
| 2001/0054148 A1 | 12/2001 | Hoornaert et al. |
| 2002/0065054 A1 | 5/2002 | Humphreys et al. |
| 2002/0111189 A1 | 8/2002 | Chou |
| 2002/0147035 A1 | 10/2002 | Su |
| 2002/0193136 A1 | 12/2002 | Halkosaari et al. |
| 2002/0197965 A1 | 12/2002 | Peng |
| 2003/0000984 A1 | 1/2003 | Vick, III |
| 2003/0096642 A1 | 5/2003 | Bessa et al. |
| 2003/0151890 A1 | 8/2003 | Huang et al. |
| 2003/0217210 A1 | 11/2003 | Carau, Sr. |
| 2003/0218445 A1 | 11/2003 | Behar |
| 2003/0228866 A1 | 12/2003 | Pezeshki |
| 2004/0096054 A1 | 5/2004 | Nuovo |
| 2004/0097256 A1 | 5/2004 | Kujawski |
| 2004/0104268 A1 | 6/2004 | Bailey |
| 2004/0247113 A1 | 12/2004 | Akatsu |
| 2004/0268005 A1 | 12/2004 | Dickie |
| 2005/0049016 A1 | 3/2005 | Cho et al. |
| 2005/0088141 A1 | 4/2005 | Lee et al. |
| 2005/0090301 A1 | 4/2005 | Lange et al. |
| 2005/0093510 A1 | 5/2005 | Seil et al. |
| 2005/0116684 A1 | 6/2005 | Kim |
| 2005/0130721 A1 | 6/2005 | Gartrell |
| 2005/0231159 A1 | 10/2005 | Jones et al. |
| 2005/0247787 A1 | 11/2005 | Von Mueller et al. |
| 2005/0248312 A1 | 11/2005 | Cao et al. |
| 2005/0286212 A1 | 12/2005 | Brignone et al. |
| 2006/0010588 A1 | 1/2006 | Schuster et al. |
| 2006/0052064 A1 | 3/2006 | Goradesky |
| 2006/0058073 A1 | 3/2006 | Kim |
| 2006/0063569 A1 | 3/2006 | Jacobs et al. |
| 2006/0099999 A1 | 5/2006 | Park |
| 2006/0105722 A1 | 5/2006 | Kumar |
| 2006/0105824 A1 | 5/2006 | Kim et al. |
| 2006/0125445 A1 | 6/2006 | Cao et al. |
| 2006/0140461 A1 | 6/2006 | Kim |
| 2006/0197674 A1 | 9/2006 | Nakajima |
| 2006/0205447 A1 | 9/2006 | Park et al. |
| 2006/0255493 A1 | 11/2006 | Fouladpour |
| 2007/0004450 A1 | 1/2007 | Parikh |
| 2007/0019804 A1 | 1/2007 | Kramer |
| 2007/0093140 A1 | 4/2007 | Begic et al. |
| 2007/0123316 A1 | 5/2007 | Little |
| 2007/0142097 A1 | 6/2007 | Hamasaki et al. |
| 2007/0152633 A1 | 7/2007 | Lee |
| 2007/0161404 A1 | 7/2007 | Yasujima et al. |
| 2007/0167190 A1 | 7/2007 | Moosavi et al. |
| 2007/0187563 A1 | 8/2007 | Ogatsu |
| 2007/0225031 A1 | 9/2007 | Bodkin et al. |
| 2007/0236180 A1 | 10/2007 | Rodgers |
| 2007/0261978 A1 | 11/2007 | Sanderson |
| 2007/0297149 A1 | 12/2007 | Richardson et al. |
| 2008/0007214 A1 | 1/2008 | Cheng |
| 2008/0026794 A1 | 1/2008 | Warren |
| 2008/0026803 A1 | 1/2008 | Demuynck |
| 2008/0032758 A1 | 2/2008 | Rostami |
| 2008/0053770 A1 | 3/2008 | Tynyk |
| 2008/0058010 A1 | 3/2008 | Lee |
| 2008/0096620 A1 | 4/2008 | Lee et al. |
| 2008/0108395 A1 | 5/2008 | Lee et al. |
| 2008/0119244 A1 | 5/2008 | Malhotra |
| 2008/0123287 A1 | 5/2008 | Rossell et al. |
| 2008/0132289 A1 | 6/2008 | Wood et al. |
| 2008/0139258 A1 | 6/2008 | Park et al. |
| 2008/0150367 A1 | 6/2008 | Oh et al. |
| 2009/0009945 A1 | 1/2009 | Johnson et al. |
| 2009/0017883 A1 | 1/2009 | Lin |
| 2009/0051319 A1 | 2/2009 | Fang et al. |
| 2009/0069050 A1 | 3/2009 | Jain et al. |
| 2009/0073650 A1 | 3/2009 | Huang et al. |
| 2009/0096417 A1 | 4/2009 | Idzik et al. |

(56) References Cited

U.S. PATENT DOCUMENTS

| | | |
|---|---|---|
| 2009/0108800 A1 | 4/2009 | Woud |
| 2009/0111543 A1 | 4/2009 | Tai et al. |
| 2009/0114556 A1 | 5/2009 | Tai et al. |
| 2009/0117955 A1 | 5/2009 | Lo |
| 2009/0128092 A1 | 5/2009 | Woud |
| 2009/0143104 A1 | 6/2009 | Loh et al. |
| 2009/0144456 A1 | 6/2009 | Gelf et al. |
| 2009/0146898 A1 | 6/2009 | Akiho et al. |
| 2009/0152089 A1 | 6/2009 | Hanes |
| 2009/0160399 A1 | 6/2009 | Woud |
| 2009/0160400 A1 | 6/2009 | Woud |
| 2009/0181729 A1 | 7/2009 | Griffin, Jr. et al. |
| 2009/0186264 A1* | 7/2009 | Huang .............................. 429/96 |
| 2009/0205983 A1 | 8/2009 | Estlander |
| 2009/0247244 A1 | 10/2009 | Mittleman et al. |
| 2009/0284216 A1 | 11/2009 | Bessa et al. |
| 2009/0301289 A1 | 12/2009 | Gynes |
| 2009/0312058 A9 | 12/2009 | Wood et al. |
| 2009/0314400 A1 | 12/2009 | Liu |
| 2009/0325657 A1 | 12/2009 | Ramsdell et al. |
| 2010/0013431 A1 | 1/2010 | Liu |
| 2010/0022277 A1 | 1/2010 | An et al. |
| 2010/0026589 A1 | 2/2010 | Dou et al. |
| 2010/0048267 A1 | 2/2010 | Lin |
| 2010/0056054 A1 | 3/2010 | Yamato et al. |
| 2010/0064883 A1 | 3/2010 | Gynes |
| 2010/0078343 A1 | 4/2010 | Hoellwarth et al. |
| 2010/0088439 A1 | 4/2010 | Ang et al. |
| 2010/0093412 A1 | 4/2010 | Serra et al. |
| 2010/0096284 A1 | 4/2010 | Bau |
| 2010/0113106 A1 | 5/2010 | Supran |
| 2010/0132724 A1 | 6/2010 | Seidel et al. |
| 2010/0154062 A1 | 6/2010 | Baram et al. |
| 2010/0195279 A1 | 8/2010 | Michael |
| 2010/0200456 A1 | 8/2010 | Parkinson |
| 2010/0203931 A1 | 8/2010 | Hynecek et al. |
| 2010/0224519 A1 | 9/2010 | Kao |
| 2010/0243516 A1 | 9/2010 | Martin et al. |
| 2010/0302716 A1 | 12/2010 | Gandhi |
| 2010/0328203 A1 | 12/2010 | Hsu |
| 2011/0021255 A1 | 1/2011 | Kim et al. |
| 2011/0034221 A1 | 2/2011 | Hung et al. |
| 2011/0049005 A1 | 3/2011 | Wilson et al. |
| 2011/0055447 A1 | 3/2011 | Costa |
| 2011/0084081 A1 | 4/2011 | Chung et al. |
| 2011/0090626 A1 | 4/2011 | Hoellwarth et al. |
| 2011/0117974 A1 | 5/2011 | Spitalnik et al. |
| 2011/0136555 A1 | 6/2011 | Ramies et al. |
| 2011/0199041 A1 | 8/2011 | Yang |
| 2011/0253569 A1 | 10/2011 | Lord |
| 2011/0259664 A1 | 10/2011 | Freeman |
| 2011/0261511 A1 | 10/2011 | Alderson et al. |
| 2011/0297578 A1 | 12/2011 | Stiehl et al. |
| 2012/0013295 A1 | 1/2012 | Yeh |
| 2012/0071214 A1 | 3/2012 | Ash, Jr. et al. |
| 2012/0088555 A1 | 4/2012 | Hu |
| 2012/0088558 A1 | 4/2012 | Song |
| 2012/0115551 A1 | 5/2012 | Cho et al. |
| 2012/0122520 A1 | 5/2012 | Phillips |
| 2012/0161696 A1 | 6/2012 | Cook et al. |
| 2012/0177967 A1* | 7/2012 | Wang .............................. 429/100 |
| 2012/0209745 A1 | 8/2012 | Spencer, II |
| 2012/0282977 A1 | 11/2012 | Haleluk |
| 2012/0303520 A1 | 11/2012 | Huang |
| 2012/0320501 A1 | 12/2012 | Ackloo |
| 2012/0325637 A1 | 12/2012 | Kikuchi |
| 2013/0045775 A1 | 2/2013 | Heywood |
| 2013/0084799 A1 | 4/2013 | Marholev et al. |
| 2013/0125251 A1 | 5/2013 | Johnson |
| 2013/0189923 A1 | 7/2013 | Lewin |
| 2013/0210475 A1 | 8/2013 | Nylund |
| 2013/0248339 A1 | 9/2013 | Koepsell |
| 2013/0273983 A1 | 10/2013 | Hsu |
| 2013/0307818 A1 | 11/2013 | Pope et al. |
| 2013/0314880 A1 | 11/2013 | Sun et al. |
| 2014/0069825 A1* | 3/2014 | Macrina et al. .................. 206/37 |
| 2014/0165379 A1 | 6/2014 | Diebel et al. |
| 2015/0010806 A1 | 1/2015 | Huang et al. |
| 2015/0072200 A1 | 3/2015 | Huang |
| 2015/0072744 A1 | 3/2015 | Huang |
| 2015/0084593 A1 | 3/2015 | Huang et al. |
| 2015/0093623 A1 | 4/2015 | Huang et al. |
| 2015/0140386 A1 | 5/2015 | Huang et al. |
| 2015/0148093 A1 | 5/2015 | Huang et al. |
| 2015/0295439 A1 | 10/2015 | Huang et al. |

FOREIGN PATENT DOCUMENTS

| | | |
|---|---|---|
| CN | 202535667 U | 11/2012 |
| CN | 302510329 S | 7/2013 |
| CN | 302573150 S | 9/2013 |
| EP | 1732291 A1 | 12/2006 |
| JP | 8-18637 | 1/1996 |
| JP | 2000-175720 | 6/2000 |
| KR | 10-2005-0027961 | 3/2005 |
| KR | 10-2008-0017688 | 2/2008 |
| KR | 20-2010-0005030 | 5/2010 |
| KR | 10-2010-0132724 | 12/2010 |
| KR | 10-2011-0005507 | 1/2011 |
| KR | 30-0650361 | 7/2012 |
| TW | D150044 | 11/2012 |
| TW | D156538 | 10/2013 |
| WO | WO 95/15619 | 6/1995 |
| WO | WO 97/33497 | 9/1997 |
| WO | WO 03/065227 A1 | 8/2003 |
| WO | WO 2008/151362 A2 | 12/2008 |

OTHER PUBLICATIONS

U.S. Appl. No. 14/205,167, filed Mar. 11, 2014, Huang et al., Including its prosecution history.

U.S. Appl. No. 29/534,901, filed Jul. 31, 2015, Dang et al., Including its prosecution history.

International Preliminary Report on Patentability for PCT/US2014/017781, dated Aug. 25, 2015.

International Preliminary Report on Patentability for PCT/US2014/023592, dated Sep. 15, 2015.

U.S. Appl. No. 90/013,319, filed Sep. 18, 2014, Huang et al., including its prosecution history.

U.S. Appl. No. 14/679,899, filed Apr. 6, 2015, Huang, Including its prosecution history.

U.S. Appl. No. 14/187,046, filed Feb. 21, 2014, To et al., Including its prosecution history.

U.S. Appl. No. 14/205,024, filed Mar. 11, 2014, Huang et al., Including its prosecution history.

U.S. Appl. No. 29/382,515, filed Jan. 4, 2011, Gallouzi et al., Including its prosecution history.

U.S. Appl. No. 29/406,346, filed Nov. 11, 2011, Brand, Including its prosecution history.

U.S. Appl. No. 29/464,620, filed Aug. 19, 2013, Tsai, Including its prosecution history.

U.S. Appl. No. 29/438,697, filed Nov. 30, 2012, Namminga et al., Including its prosecution history.

U.S. Appl. No. 29/451,703, filed Apr. 6, 2013, Tsai et al., Including its prosecution history.

U.S. Appl. No. 29/435,907, filed Oct. 30, 2012, To et al., Including its prosecution history.

U.S. Appl. No. 29/438,877, filed Dec. 4, 2012, To et al., Including its prosecution history.

U.S. Appl. No. 29/440,062, filed Dec. 18, 2012, To et al., Including its prosecution history.

U.S. Appl. No. 29/478,391, filed Jan. 3, 2014, Namminga et al., Including its prosecution history.

U.S. Appl. No. 29/478,390, filed Jan. 3, 2014, Dang et al., Including its prosecution history.

U.S. Appl. No. 29/478,383, filed Jan. 3, 2014, Dang et al., Including its prosecution history.

U.S. Appl. No. 29/478,388, filed Jan. 3, 2014, Kim et al., Including its prosecution history.

(56) References Cited

OTHER PUBLICATIONS

U.S. Appl. No. 29/499,868, filed Aug. 19, 2014, Mophie, Inc., Including its prosecution history.
U.S. Appl. No. 29/510,154, filed Nov. 25, 2014, Mophie, Inc., Including its prosecution history.
U.S. Appl. No. 29/510,153, filed Nov. 25, 2014, Mophie, Inc., Including its prosecution history.
U.S. Appl. No. 29/522,987, filed Apr. 6, 2015, Gjøvik et al., Inc., Including its prosecution history.
U.S. Appl. No. 29/510,839, filed Dec. 3, 2014, Mophie, Inc., Including its prosecution history.
U.S. Appl. No. 29/523,211, filed Apr. 7, 2015, To et al., Including its prosecution history.
U.S. Appl. No. 29/523,209, filed Apr. 7, 2015, Mophie, Inc., Including its prosecution history.
U.S. Appl. No. 29/528,266, filed May 27, 2015, Gjøvik et al., Including its prosecution history.
International Search Report and Written Opinion of the International Searching Authority for PCT/US2011/037244, dated Jul. 19, 2011.
International Preliminary Report on Patentability for PCT/US2011/037244, dated Nov. 29, 2012.
International Search Report and Written Opinion of the International Searching Authority for PCT/US2011/037249, dated Jul. 13, 2011.
International Preliminary Report on Patentability for PCT/US2011/037249, dated Nov. 29, 2012.
International Search Report and Written Opinion of the International Searching Authority for PCT/US2011/037254, dated Jul. 13, 2011.
International Preliminary Report on Patentability for PCT/US2011/037254, dated Nov. 29, 2012.
International Search Report and Written Opinion of the International Searching Authority for PCT/US2011/037257, dated Sep. 22, 2011.
International Preliminary Report on Patentability for PCT/US2011/037257, dated Nov. 29, 2012.
International Search Report and Written Opinion of the International Searching Authority for PCT/US2012/041768, dated Feb. 27, 2013.
International Preliminary Report on Patentability for PCT/US2012/041768, dated Dec. 27, 2013.
International Search Report and Written Opinion of the International Searching Authority for PCT/US2013/057276, dated Dec. 10, 2013.
International Preliminary Report on Patentability for PCT/US2013/057276, dated Mar. 3, 2015.
International Search Report and Written Opinion of the International Searching Authority for PCT/US2014/017781, dated Jun. 8, 2014.
International Search Report and Written Opinion of the International Searching Authority for PCT/US2014/023592, dated Aug. 28, 2014.
International Search Report and Written Opinion for PCT/US2014/067470, dated Mar. 31, 2015.
Mophie Pulse for iPod Touch 4G, http://www.mophie.com/pulse-iPod-Touch-4th-Gen-vibrating-gaming-case-p/2015_PUL-T4-GRY.htm.
"Sandberg BatteryCase for iPhone 4/4S delivers more band for your buck," dated Mar. 15, 2012, http://www.gizmag.com/sanberg-batterycase-iphone/21839.
Shawn Brown, "Incase Power Slider battery doubles as a case," dated Nov. 19, 2008, http://www.iphonebuzz.com/incase-power-slider-battery-doubles-as-a-case-195224.php.
Nick Guy, "Incipio offGRID Battery Case for iPhone 5/5s," dated Oct. 9, 2013, http://www.ilounge.com/index.php/reviews/entry/incipio-offgrid-battery-case-for-iphone-5-5s/.
Jeremy Horwitz, "Mophie Juice Pack Plus for iPhone 5," dated May 21, 2013, http://www.ilounge.com/index.php/reviews/entry/mophie-juice-pack-plus-for-iphone-5/.
Nick Guy, "RND Power Solutions Sync & Charge Dock with Lightning Connector," dated Nov. 18, 2013, http://www.ilounge.com/index.php/reviews/entry/tylt-energi-sl.
Jeremy Horwitz, "Kensington Mini Battery Pack and Charger for iPhone and iPod," dated May 16, 2008, http://www.ilounge.com/index.php/reviews/entry/kensington-mini-battery-pack-and-charger-for-iphone-and-ipod/.
Kensington Mini Battery Pack and Charger for iPhone and iPod, dated Sep. 30, 2008, 1 page.
Sven Rafferty, "Mybat External Battery for iPhone and iPod," dated May 18, 2008, http://svenontech.com/reviews/?p=74.
Dave Rees, "Richard Solo Backup Battery for iPhone / iPod Review," dated Jun. 16, 2008, http://the-gadgeteer.com/2008/06/16/richard_solo_backup_battery_for_iphone_ipod/.
Devin Coldewey, "Combination iPhone battery pack and flash from FastMac," dated Nov. 4, 2008, http://crunchgear.com/2008/11/04/combination-iphone-battery-pack-and-flash-from-fastmac/.
"Cheap DIY iPhone External Battery," dated Jul. 22, 2008, http://fastdad.wordpress.com/2008/07/22/cheap-diy-iphone-external-battery/.
Jeremy Horwitz, "iLuv 1603 /1604 Rechargeable Lithium Polymer Batteries with Silicone Skin," dated Jun. 27, 2006, http://www.ilounge.com/index.php/reviews/entry/iluv-i603-rechargeable-lithium-polymer-battery-with-silicone-skin/.
Julie Strietelmeier, "Seidio INNODock Desktop Cradle for Treo 650," dated Jul. 28, 2005, http://the-gadgeteer.com/2005/07/28/seidio_innodock_desktop_cradle_for_treo_650/.
Brian Nyhuis, "Mophie Juice Pack Battery Case for Samsung Galaxy S III Review," dated Nov. 28, 2012, http://www.legitreviews.com/mophie-juice-pack-battery-case-for-samsung-galaxy-s-iii-review_2084.
"PowerSkin Samsung Galaxy S3 Case with Backup Battery," dated Aug. 19, 2012, http://gadgetsin.com/powerskin-samsung-galaxy-s3-case-with-backup-battery.htm.
"iPhone 4 Case with Battery Pack," dated Sep. 28, 2010, http://gadgetsin.com/iphone-4-case-with-battery-pack.htm.
Jonathan Pena, "iPhone 5 Cases, Round 3," dated Sep. 16, 2012, http://www.technologytell.com/apple/103833/iphone-5-cases-round-3/.
Jeremy Horwitz, "Mophie Juice Pack for iPhone," dated Dec. 7, 2007, http://www.ilounge.com/index.php/reviews/entry/mophie-juice-pack-for-iphone/.
Dr. Macenstein, "Review: Mophie Juice Pack for iPhone," dated Apr. 27, 2008, http://macenstein.com/default/archives/1314.
Wayne Schulz, "iPhone Extended Battery Review—Mophie Juice Pack," dated Jun. 17, 2008, http://www.geardiary.com/2008/06/17/iphone-extended-battery-review-mophie-juice-pack/.
Mophie Juice Pack iPhone 1G Product—Figures 1-7—Retrieved from http://www.mophie.com/products/juice-pack on Apr. 10, 2009.
Mophie Juice Pack iPhone 1G Product—Figure 8—Retrieved from http://www.mophie.com/pages/information/ on Apr. 10, 2009.
Mophie Juice Pack iPhone 1G Product—Figures 9-14—Retrieved from http://www.mophie.com/blogs/Juice_Pack_FAQ on Apr. 10, 2009.
Mophie Juice Pack iPhone 1G Product—Figures 15-16—Retrieved from http://mophie.com/blogs/Juice_Pack_FAQ on Apr. 20, 2009. Figure 16 is dated May 1, 2008.
Tomas Ratas, "Mophie Juice Pack—iPhone 3G," dated Dec. 9, 2008, http://www.testfreaks.com/blog/review/mophie-juice-pack-iphone-3g/.
Dr. Macenstein, "Review: Mophie Juice Pack 3G for iPhone," dated Nov. 27, 2008, http://macenstein.com/default/archives/1820.
Ewdison Then, "Mophie Juice Pack iPhone 3G Review," dated Nov. 12, 2008, http://www.slashgear.com/mophie-juice-pack-iphone-3g-review-1222446/.
Mophie Juice Pack iPhone 3G Product—Figures 1-8—Retrieved from http://www.mophie.com/products/juice-pack-iphone-3g on Apr. 10, 2009.
Mophie Juice Pack iPhone 3G Product—Figures 9-10—Retrieved from http://www.mophie.com/pages/iphone-3g-details on Apr. 10, 2009.
Mophie Juice Pack iPhone 3G Product—Figures 11-14—Retrieved from http://mophie.com/blogs/Juice_Pack_3G_FAQ on Apr. 10, 2009.
Mophie Juice Pack iPhone 3G Product—Figures 15-16—Retrieved from http://mophie.com/blogs/press on Apr. 20, 2009. Figure 15 is dated Aug. 4, 2008, and Figure 16 is dated Nov. 10, 2008.
Mophie Juice Pack iPhone 3G User Manual—Retrieved from http://static3.shopify.com/s/files/1/0008/4942/assets/mophie_juice_pack_3G_manual_rl.pdf on Apr. 10, 2009.

(56) References Cited

OTHER PUBLICATIONS

Panasonic Lithium Ion Batteries Technical Handbook, dated 2007.
Chris Foresman, "Several Backup Batteries Can Extend Your Daily iPhone 3G Use," dated Jul. 18, 2008, http://arstechnica.com/apple/2008/07/several-backup-batteries-can-extend-your-daily-iphone-3g-use/.
Using Your Treo 650 Smartphone by palmOne, dated 2005.
Lisa Gade, "Palm Treo 750," dated Jan. 17, 2007, http://www.mobiletechreview.com/phones/Treo-750.htm.
Incase Power Slider 3G for iPhone 3G Product Reference, alleged by Incase to be available on Nov. 28, 2008.
iPhone User's Guide, 2007.
"Power Slider," Web Archive Date Dec. 4, 2008, https://web.archive.org/web/20081204105303/http://goincase.com/products/detail/power-slider-ec20003/?
Azadeh Ensha, "A Case for Filling the iPhone 3G's Power Vacuum," Dated Nov. 27, 2008.
Joseph Flatley, "Incase Power Slider for iPhone 3G Doubles the Juice, Lets You Sync," dated Nov. 17, 2008.
Darren Quick, "Mophie Juice Pack for iPhone 3G now shipping," dated Nov. 10, 2008, http://www.gizmag.com/mophie-juice-pack-iphone-3g/10342/.
Otterbox Catalog, 2006.
Jeremy Horowitz, "PhoneSuit MiLi Power Pack for iPhone," Jan. 29, 2009, http://www.ilounge.com/index.php/reviews/entry/phonesuit-mili-power-pack-for-iphone/.
Jeremy Horowitz, "FastMac TruePower iV Universal Battery Charger," Dec. 11, 2008, http://www.ilounge.com/index.php/reviews/entry/fastmac-truepower-iv-universal-battery-charger/.
Jeremy Horowitz, "Konnet PowerKZ Extended Power for iPhone," Apr. 2, 2009, http://www.ilounge.com/index.php/reviews/entry/konnet-powerkz-extended-power-for-iphone/.
"Test: Batterie iPhone SKPAD" with Machine English Translation, Feb. 2, 2009, http://iphonesofa.com/2009/02/02/test-batterie-iphone-skpad.
Kanamori et al., "USB battery-charger designs meet new industry standards," EDN pp. 63-70, dated Feb. 21, 2008.
AVR458: Charging Lithium-Ion Batteries with ATAVRBC100, which appear to include a date of Aug. 2008.
Battery Charging Specification, dated Apr. 15, 2009.
BCM2033 Product Brief, 2 pages, dated Nov. 1, 2002.
"USB battery charger detector intelligently powers mobiles," Dec. 17, 2007, http://www.eetasia.com/ART_8800493819_765245_NP_10b171b6.HTMce#.
Webpage Archive, Mophie.com, Nov. 25, 2007.
Ben Kaufman, "Behind the Invention: The mophie Juice Pack," dated Dec. 31, 2013, https://medium.com/@benkaufman/behind-the-invention-the-mophie-juice-pack-a0620f74efcf.
Mophie Relo Recharge, dated Feb. 7, 2006, http://songsling.com/recharge.html.
*Case-Ari, LLC* v. *mStation, Inc.*, Case No. 1:2010-CV-01874 in the United States District Court for the Northern District of Georgia, filed Jun. 17, 2010 (Docket).
*Daniel Huang* v. *GC Technology, LLC*, Case No. CV10-4705 CAS (VBKx) in the United States District Court for the Central District of California, filed Jun. 24, 2010 (Docket).
*Hali-Power, Inc.* v. *mStation Corp.*, Case No. 1:2010-CV-00773 in the United States District Court for the Northern District of New York, filed Jun. 30, 2010 (Docket).
*Mophie, Inc.* v. *Loza & Loza, LLP*, Case No. SACV11-00539 Doc (MLGx) in the United States District Court for the Central District of California, filed Apr. 7, 2011 (Docket).
Mophie's Complaint, filed Apr. 7, 2011 in *Mophie, Inc.* v. *Loza & Loza, LLP*, Case No. SACV11-00539 DOC (MLGx) in the United States District Court for the Central District of California.
*Mophie, Inc.* v. *Foreign Trade Corporation*, Case No. 8:12-CV-00292-JST-RNB in the United States District Court for the Central District of California, filed Feb. 24, 2012 (Docket).

*Mophie, Inc.* v. *Kdlinks Inc.*, Case No. 2:2012-CV-02639 in the United States District Court for the Central District of California, filed Mar. 27, 2012 (Docket).
*Otter Products, LLC* v. *Mophie, LLC*, Case No. 1:2012-CV-01969 in the United States District Court for the District of Colorado, filed Jul. 27, 2012 (Docket).
Mophie's Answer, filed Oct. 15, 2012 in *Otter Products, LLC* v. *Mophie, LLC*, Case No. 1:2012-CV-01969 in the United States District Court for the District of Colorado.
Otter's Motion for Summary Judgment of Infringement and Declaration in Support Thereof, filed May 13, 2013 in *Otter Products, LLC* v. *Mophie, LLC*, Case No. 1:2012-CV-01969 in the United States District Court for the District of Colorado.
Mophie's Opposition to Motion for Summary Judgment of Infringement, filed Jun. 6, 2013 in *Otter Products, LLC* v. *Mophie, LLC*, Case No. 1:2012-CV-01969 in the United States District Court for the District of Colorado.
Mophie's Claim Construction Brief, filed Jun. 14, 2013 in *Otter Products, LLC* v. *Mophie, LLC*, Case No. 1:2012-CV-01969 in the United States District Court for the District of Colorado.
Otter's Claim Construction Brief, filed Jun. 14, 2013 in *Otter Products, LLC* v. *Mophie, LLC*, Case No. 1:2012-CV-01969 in the United States District Court for the District of Colorado.
Mophie's Brief in Response to Otter's Claim Construction Brief, filed Jun. 24, 2013 in *Otter Products, LLC* v. *Mophie, LLC*, Case No. 1:2012-CV-01969 in the United States District Court for the District of Colorado.
Otter's Rebuttal Brief for Construction of Claim Terms and Declaration, filed Jun. 24, 2013 in *Otter Products, LLC* v. *Mophie, LLC*, Case No. 1:2012-CV-01969 in the United States District Court for the District of Colorado.
Otter's Reply in Support of Motion for Summary Judgment of Infringement, filed Jun. 24, 2013 in *Otter Products, LLC* v. *Mophie, LLC*, Case No. 1:2012-CV-01969 in the United States District Court for the District of Colorado.
Joint Claim Construction Statement, filed Jun. 26, 2013 in *Otter Products, LLC* v. *Mophie, LLC*, Case No. 1:2012-CV-01969 in the United States District Court for the District of Colorado.
*Incase Designs, Inc.* v. *Mophie, Inc.*, Case No. 3:2013-CV-00602 in the United States District Court for the Northern District of California, filed Feb. 12, 2013 (Docket).
Mophie's Amended Answer and Counterclaims, filed May 8, 2013 in *Incase Designs, Inc.* v. *Mophie, Inc.*, Case No. 3:2013-CV-00602 in the United States District Court for the Northern District of California.
Mophie's Opposition to Motion to Strike Amended Affirmative Defenses, Filed Jun. 12, 2013 in *Incase Designs, Inc.* v. *Mophie, Inc.*, Case No. 3:2013-CV-00602 in the United States District Court for the Northern District of California.
Mophie's Reply in Support of Motion to Stay and Supporting Declaration, filed Sep. 3, 2103 in *Incase Designs, Inc.* v. *Mophie, Inc.*, Case No. 3:2013-CV-00602 in the United States District Court for the Northern District of California.
*Incase Designs, Inc.* v. *Mophie, Inc.*, Case No. 3:2013-CV-03356 in the United States District Court for the Northern District of California, filed Jul. 18, 2013 (Docket).
*Incase Designs, Corp.* v. *Mophie, Inc.*, Case No. 3:2013-CV-04314 in the United States District Court for the Northern District of California, filed Sep. 18, 2013 (Docket).
Mophie Motion 1—To Be Accorded Benefit, filed Nov. 20, 2013 in Patent Interference No. 105,946(RES).
Declaration of John Feland, Ph.D, In Support of Mophie Motion 1 to Be Accorded Benefit, dated Nov. 20, 2013, in Patent Interference No. 105,946(RES).
Mophie Motion 2—For Judgment that Incase's Involved Claims Are Unpatentable, filed Nov. 20, 2013 in Patent Interference No. 105,946(RES).
Declaration of John Feland, Ph.D, in Support of Mophie Motion 2 for Judgement That Incase's Involved Claims Are Unpatentable, dated Nov. 20, 2013, in Patent Interference No. 105,946(RES).
Incase Motion 1—Motion for Benefit, filed Nov. 20, 2013 in Patent Interference No. 105,946(RES).

(56) References Cited

OTHER PUBLICATIONS

Incase Motion 2—Motion to Undesignate Claims, filed Nov. 20, 2013 in Patent Interference No. 105,946(RES).
Incase Motion 3—Motion for Judgment Based on Lack of Written Description, filed Nov. 20, 2013 in Patent Interference No. 105,946(RES).
Incase Motion 4—Motion for Unpatentability of Mophie Claims, filed Nov. 20, 2013 in Patent Interference No. 105,946(RES).
Declaration of Andrew Wolfe, filed Nov. 20, 2013 in Patent Interference No. 105,946(RES).
Declaration of Thomas Overthun, filed Nov. 20, 2013 in Patent Interference No. 105,946(RES).
Declaration of Gabriel Dan, filed Nov. 20, 2013 in Patent Interference No. 105,946(RES).
Mophie's Third Amended Complaint, filed Jun. 27, 2014, in *Mophie, Inc. v. Source Vista*, Case No. 8:13-CV-01321 in the United States District Court for the Central District of California.
LivingSocial's Answer to Mophie's Fifth Amended Complaint and Counterclaims, filed Sep. 24, 2014, in *Mophie, Inc. v. Source Vista*, Case No. 8:13-CV-01321 in the United States District Court for the Central District of California.
Shah's Answer, Affirmative Defenses, and Counterclaims to Plaintiff's Fifth Amended Complaint, filed Sep. 24, 2014, in *Mophie, Inc. v. Source Vista*, Case No. 8:13-CV-01321 in the United States District Court for the Central District of California.
Expert Report of Dr. David Munson, dated Aug. 28, 2014, in *Mophie, Inc. v. Source Vista*, Case No. 8:13-CV-01321 in the United States District Court for the Central District of California.
Expert Report of John Feland, Ph.D, dated Aug. 28, 2014, in *Mophie, Inc. v. Source Vista*, Case No. 8:13-CV-01321 in the United States District Court for the Central District of California.
Rebutal Expert Report of John Feland, Ph.D, dated Sep. 25, 2014, in *Mophie, Inc. v. Source Vista*, Case No. 8:13-CV-01321 in the United States District Court for the Central District of California.
Rebutal Expert Report of Dr. David Munson, dated Sep. 25, 2014, in *Mophie, Inc. v. Source Vista*, Case No. 8:13-CV-01321 in the United States District Court for the Central District of California.
Mophie's Second Amended Response to LivingSocial's Interrogatory No. 1[21], dated Aug. 28, 2014, in *Mophie, Inc. v. Source Vista*, Case No. 8:13-CV-01321 in the United States District Court for the Central District of California.
Mophie's Second Amended Response to Serve Global's Interrogatory No. 2, dated Aug. 28, 2014, in *Mophie, Inc. v. Source Vista*, Case No. 8:13-CV-01321 in the United States District Court for the Central District of California.
Defendant's Memorandum in Support of Motion for Partial Summary Judgement, dated Sep. 23, 2014, in *Mophie, Inc. v. Source Vista*, Case No. 8:13-CV-01321 in the United States District Court for the Central District of California.
Declaration of David Munson in Support of Defendant's Motion for Partial Summary Judgment, dated Sep. 22, 2014, in *Mophie, Inc. v. Source Vista*, Case No. 8:13-CV-01321 in the United States District Court for the Central District of California.
John Feland, Ph.D. Deposition Transcript, dated Sep. 30, 2014, in *Mophie, Inc. v. Source Vista*, Case No. 8:13-CV-01321 in the United States District Court for the Central District of California.
Matthew Brand Deposition Transcript, dated Jul. 23, 2014, in *Mophie, Inc. v. Source Vista*, Case No. 8:13-CV-01321 in the United States District Court for the Central District of California.
Dharmesh Shah Deposition Transcript, dated Jul. 11, 2014, in *Mophie, Inc. v. Source Vista*, Case No. 8:13-CV-01321 in the United States District Court for the Central District of California.
Defendants' Statement of Uncontroverted Material Fact and Contentions of Law, filed Sep. 22, 2014 in *Mophie, Inc. v. Source Vista*, Case No. 8:13-CV-01321 in the United States District Court for the Central District of California.
Memorandum of Points and Authorities in Support of Mophie's Motion for Summary Judgment, filed Sep. 22, 2014, in *Mophie, Inc. v. Source Vista*, Case No. 8:13-CV-01321 in the United States District Court for the Central District of California.

Statement of Uncontroverted Facts and Conclusions of Law in Support of Mophie's Motion for Summary Judgment, filed Sep. 22, 2014, in *Mophie, Inc. v. Source Vista*, Case No. 8:13-CV-01321 in the United States District Court for the Central District of California.
Mophie's Opposition to Shah and Serve Global's Motion for Partial Summary Judgment, dated Oct. 3, 2014, in *Mophie, Inc. v. Source Vista*, Case No. 8:13-CV-01321 in the United States District Court for the Central District of California.
Statement of Genuine Disputes of Material Fact in Opposition to Shah and Serve Global's Motion for Partial Summary Judgment, filed Oct. 3, 2014, in *Mophie, Inc. v. Source Vista*, Case No. 8:13-CV-01321 in the United States District Court for the Central District of California.
Opposition of LivingSocial to Mophie's Motion for Summary Judgment, dated Oct. 3, 2014, in *Mophie, Inc. v. Source Vista*, Case No. 8:13-CV-01321 in the United States District Court for the Central District of California.
Defendants' Opposition to Plaintiff's Motion for Summary Judgment, filed Oct. 3, 2014, in *Mophie, Inc. v. Source Vista*, Case No. 8:13-CV-01321 in the United States District Court for the Central District of California.
Defendants' Response to Plaintiffs Statement of Uncontroverted Material Fact and Contentions of Law, filed Oct. 3, 2014, in *Mophie, Inc. v. Source Vista*, Case No. 8:13-CV-01321 in the United States District Court for the Central District of California.
David Munson Deposition Transcript, dated Sep. 29, 2014, in *Mophie, Inc. v. Source Vista*, Case No. 8:13-CV-01321 in the United States District Court for the Central District of California.
Mophie's First Amended Complaint, filed Jun. 25, 2014, in *Mophie, Inc. v. UNU Electronics Inc.*, Case No. 8:13-CV-01705 in the United States District Court for the Central District of California.
UNU's Answer and Counterclaims, filed Jul. 10, 2014, in *Mophie, Inc. v. UNU Electronics Inc.*, Case No. 8:13-CV-01705 in the United States District Court for the Central District of California.
Mophie's Responses to Defendant's Third Set of Interrogatories (No. 12), dated Aug. 21, 2014, in *Mophie, Inc. v. UNU Electronics Inc.*, Case No. 8:13-CV-01705 in the United States District Court for the Central District of California.
Mophie's Responses to Defendant's First set of Requests for Admissions (Nos. 1-46), dated Aug. 19, 2014, in *Mophie, Inc. v. UNU Electronics Inc.*, Case No. 8:13-CV-01705 in the United States District Court for the Central District of California.
Mophie's Responses to Defendant's Second set of Requests for Admissions (Nos. 47-109), dated Aug. 19, 2014, in *Mophie, Inc. v. UNU Electronics Inc.*, Case No. 8:13-CV-01705 in the United States District Court for the Central District of California.
Request for Ex Parte Reexamination of U.S. Pat. No. 8,367,235, filed Aug. 14, 2014.
Corrected Request for Ex Parte Reexamination of U.S. Pat. No. 8,367,235, filed Sep. 18, 2014.
Declaration of John Feland, Ph.D. in Support of Mophie's Opposition to Defendants Motion for Partial Summary Judgment, filed Oct. 3, 2014, in *Mophie, Inc. v. Source Vista*, Case No. 8:13-CV-01321 in the United States District Court for the Central District of California.
LivingSocial's Reply in Support of Motion for Summary Judgment, Filed Oct. 10, 2014, in *Mophie, Inc. v. Source Vista*, Case No. 8:13-CV-01321 in the United States District Court for the Central District of California.
Defendants' Reply in Support of Motion for Partial Summary Judgment, Filed Oct. 10, 2014, in *Mophie, Inc. v. Source Vista*, Case No. 8:13-CV-01321 in the United States District Court for the Central District of California.
Reply in Support of Mophie's Motion for Summary Judgment, Filed Oct. 10, 2014, in *Mophie, Inc. v. Source Vista*, Case No. 8:13-CV-01321 in the United States District Court for the Central District of California.
Mophie's Reply to Counterclaims of LivingSocial, filed Oct. 14, 2014, in *Mophie, Inc. v. Source Vista*, Case No. 8:13-CV-01321 in the United States District Court for the Central District of California.
Mophie's Reply to Counterclaims of Shah, filed Oct. 14, 2014, in *Mophie, Inc. v. Source Vista*, Case No. 8:13-CV-01321 in the United States District Court for the Central District of California.

(56) References Cited

OTHER PUBLICATIONS

Defendant's Response to Mophie's Fourth Set of Interrogatories, dated Sep. 23, 2014, in *Mophie, Inc. v. UNU Electronics Inc.*, Case No. 8:13-CV-01705 in the United States District Court for the Central District of California.
Plaintiff Mophie's Preliminary Claim Constructions and Identification of Extrinsic Evidence, dated Oct. 14, 2014, in *Mophie, Inc. v. UNU Electronics Inc.*, Case No. 8:13-CV-01705 in the United States District Court for the Central District of California.
Defendant's Preliminary Claim Constructions and Extrinsic Evicence, dated Oct. 14, 2014, in *Mophie, Inc. v. UNU Electronics Inc.*, Case No. 8:13-CV-01705 in the United States District Court for the Central District of California.
Plaintiff Mophie's Opening Brief on Claim Construction, filed Oct. 29, 2014, in *Mophie, Inc. v. UNU Electronics Inc.*, Case No. 8:13-CV-01705 in the United States District Court for the Central District of California.
Declaration of John Feland, Ph.D. in Support of Plaintiff's Preliminary Claim Constructions, filed Oct. 29, 2014, in *Mophie, Inc. v. UNU Electronics Inc.*, Case No. 8:13-CV-01705 in the United States District Court for the Central District of California.
Supplemental Declaration of John Feland, Ph.D. in Support of Plaintiff's Claim Constructions, filed Oct. 29, 2014, in *Mophie, Inc. v. UNU Electronics Inc.*, Case No. 8:13-CV-01705 in the United States District Court for the Central District of California.
Declaration of Sheila N. Swaroop in Support of Mophie's Opening Claim Construction Brief, filed Oct. 29, 2014, in *Mophie, Inc. v. UNU Electronics Inc.*, Case No. 8:13-CV-01705 in the United States District Court for the Central District of California.
Transcript of Deposition of John Feland, dated Oct. 21, 2014, in *Mophie, Inc. v. UNU Electronics Inc.*, Case No. 8:13-CV-01705 in the United States District Court for the Central District of California.
Defendant's Opening Claim Construction Brief, dated Oct. 29, 2014, in *Mophie, Inc. v. UNU Electronics Inc.*, Case No. 8:13-CV-01705 in the United States District Court for the Central District of California.
Order Granting Request for Ex Parte Reexamination of U.S. Pat. No. 8,367,235, in Reexamination Control No. 90/013,319, dated Oct. 24, 2014.
Order Re LivingSocial's Motion for Summary Judgment, Mophie's Motion for Summary Judgment, Source Vista and Shah's Motion for Partial Summary Judgment, and Mophie's Motion to Bifurcate, dated Nov. 12, 2014, in *Mophie, Inc. v. Source Vista*, Case No. 8:13-CV-01321 in the United States District Court for the Central District of California.
Mophie's Memorandum in Support of its Motion for Reconsideration, filed Nov. 19, 2014, in *Mophie, Inc. v. Source Vista*, Case No. 8:13-CV-01321 in the United States District Court for the Central District of California.
Declaration of Sheila N. Swaroop in Support of Mophie's Motion for Reconsideration, filed Nov. 19, 2014, in *Mophie, Inc. v. Source Vista*, Case No. 8:13-CV-01321 in the United States District Court for the Central District of California.
Order Denying Plantiff's Motion for Reconsideration, dated Nov. 21, 2014, in *Mophie, Inc. v. Source Vista*, Case No. 8:13-CV-01321 in the United States District Court for the Central District of California.
Defendants Dharmesh Shah and Serve Global, LLC's Memorandum of Points and Authorities in Support of Defendants's Motion for Attorney's Fees, filed Mar. 21, 2015, in *Mophie, Inc. v. Source Vista*, Case No. 8:13-CV-01321 in the United States District Court for the Central District of California.
Memorandum of Points and Authorities in Support of Livingsocial, Inc.'s Motion for Legal Fees and Costs, filed Mar. 20, 2015, in *Mophie, Inc. v. Source Vista*, Case No. 8:13-CV-01321 in the United States District Court for the Central District of California.
Plaintiff Mophie, Inc.'s Opposition to Defendants Dharmesh Shah and Serve Global, LLC's Motion for Attorneys' Fees, filed Apr. 3, 2015, in *Mophie, Inc. v. Source Vista*, Case No. 8:13-CV-01321 in the United States District Court for the Central District of California.
Plaintiff Mophie, Inc.'s Opposition to Defendant Livingsocial, Inc.'s Motion for Attorneys' Fees, filed Apr. 3, 2015, in *Mophie, Inc. v. Source Vista*, Case No. 8:13-CV-01321 in the United States District Court for the Central District of California.
Reply to Plaintiff's Opposition to Defendants Dharmesh Shah and Serve Global, LLC's Motion for Attorney's Fees, filed Apr. 10, 2015, in *Mophie, Inc. v. Source Vista*, Case No. 8:13-CV-01321 in the United States District Court for the Central District of California.
Reply in Support of Livingsocial, Inc.'s Motion for Legal Fees and Costs, filed Apr. 10, 2015, in *Mophie, Inc. v. Source Vista*, Case No. 8:13-CV-01321 in the United States District Court for the Central District of California.
Amended Final Judgment and Permanent Injunction, dated Dec. 11, 2015, in *Mophie, Inc. v. Source Vista*, Case No. 8:13-CV-01321 in the United States District Court for the Central District of California.
Order Re Motions for Attorneys' Fees, Motion to Amend Permanent Injunction, Motions for Judgment as a Matter of Law, Motion for Relief From Judgment, and Motion for New Trial, dated Dec. 11, 2015, in *Mophie, Inc. v. Source Vista*, Case No. 8:13-CV-01321 in the United States District Court for the Central District of California.
Mophie's Complaint, filed Dec. 16, 2015, in *Mophie, Inc. v. Cute Mobile Inc.*, Case No. 8:15-cv-02086 in the United States District Court for the Central District of California.

\* cited by examiner

PROTECTIVE BATTERY CASE TO PARTIALLY ENCLOSE A MOBILE ELECTRONIC DEVICE

CROSS-REFERENCE TO RELATED APPLICATIONS

The application claims the benefit of U.S. Provisional Patent Application No. 62/093,339, filed Dec. 17, 2014, and titled BATTERY CASE, and U.S. Provisional Patent Application No. 62/130,553, filed Mar. 9, 2015, and titled BATTERY CASE. The entirety of each of the above-identified applications is hereby incorporated by reference and made a part of this specification.

BACKGROUND

1. Field of the Disclosure

This disclosure relates to battery cases for use with mobile electronic devices.

2. Description of the Related Art

Although various battery cases are available, there remains a need for improved battery cases for use with mobile electronic devices.

SUMMARY OF CERTAIN EMBODIMENTS

Certain embodiments are summarized below by way of example and are not intended to limit the scope of the claims.

Various embodiments disclosed herein can relate to a protective battery case for use with a mobile electronic device. The protective battery case can include a lower case portion comprising a battery, a back wall configured to extend across at least a portion of a back of the mobile electronic device, a bottom wall configured to extend along at least a portion of a bottom of the mobile electronic device, a lower right side wall configured to extend along at least a portion of a lower right side of the mobile electronic device, a lower left side wall configured to extend along at least a portion of a lower left side of the mobile electronic device, and an open top side to facilitate insertion of the mobile electronic device into the lower case portion. The lower case portion of the protective battery case can include a device interface that can extend from the bottom wall and can be configured to electrically couple to a corresponding interface on the mobile electronic device when the mobile electronic device is in the protective battery case. The device interface can be electrically coupled to the battery and can be configured to deliver electrical power from the battery to the mobile electronic device. The lower case portion of the protective battery case can include a charging interface configured to receive electrical power and electrically coupled to the battery for charging the battery. The lower case portion can include a left side bumper extending along at least a portion of an inside of the lower left side wall and at least a portion of an inside lower left corner of the protective battery case and configured to abut against at least a portion of the lower left side and at least a portion of the lower left corner of the mobile electronic device. The lower case portion can include a right side bumper extending along at least a portion of an inside of the lower right side wall and at least a portion of an inside lower right corner of the protective battery case and configured to abut against at least a portion of the lower right side and at least a portion of the lower right corner of the mobile electronic device.

The protective battery case can include an upper case portion, which can include a top wall configured to extend along at least a portion of a top of the mobile electronic device, an upper right side wall configured to extend along at least a portion of an upper right side of the mobile electronic device, and an upper left side wall configured to extend along at least a portion of an upper left side of the mobile electronic device. The upper case portion can include a top side bumper extending along at least a portion of an inside of the top wall, at least a portion of an inside upper right corner, and at least a portion of an inside upper left corner of the protective battery case and configured to abut against at least a portion of the top, at least a portion of the upper right corner, and at least a portion of the upper left corner of the mobile electronic device. The lower case portion and the upper case portion can be configured to removably couple together to at least partially enclose the mobile electronic device. A front opening of the protective battery case can be configured such that a display of the mobile electronic device is visible through the front opening.

The battery can be disposed inside the back wall, and the battery can be configured to be behind the back side of the mobile electronic device. The protective battery case can be configured to house a smartphone. The protective battery case can have an external shape that generally corresponds to an external shape of the mobile electronic device (e.g., the smartphone).

The right side bumper, the left side bumper, and the top side bumper can include an elastomeric material. The left side bumper, the right side bumper, and the top side bumper can have concave inward facing surfaces. The left side bumper, the right side bumper, and the top side bumper together can extend across at least about 50 percent of the side perimeter of the inside of the protective battery case.

The left side bumper can include a single integral bumper element that extends along the at least a portion of the inside of the lower left side wall and the at least a portion of the inside lower left corner of the protective battery case. The right side bumper can include a single integral bumper element that extends along the at least a portion of the inside of the lower right side wall and the at least a portion of the inside lower right corner of the protective battery case. The top side bumper can include a single integral bumper element that extends along the at least a portion of the inside of the top wall, the at least a portion of the inside upper right corner, and the at least a portion of the inside upper left corner of the protective battery case.

Various embodiments disclosed herein can relate to a protective battery case for use with a mobile electronic device. The protective battery case ca include a first case portion that has a battery, a back wall configured to extend across at least a portion of a back of the mobile electronic device, a bottom wall configured to extend along at least a portion of a bottom of the mobile electronic device, an open top side to facilitate insertion of the mobile electronic device into the lower case portion, and a device interface configured to electrically couple to a corresponding interface on the mobile electronic device when the mobile electronic device is in the protective battery case. The device interface can be electrically coupled to the battery and can be configured to deliver electrical power from the battery to the mobile electronic device. The first case portion can include a charging interface configured to receive electrical power and electrically coupled to the battery for charging the battery. The protective battery case can include a second case portion configured to removably couple to the first case portion to provide a closed configuration for housing the mobile electronic device, and configured to decouple from the first case portion to provide an open configuration to facilitate insertion of the mobile electronic device into the protective battery case. The second case portion can include a top wall configured to extend along at least a portion of a top of the mobile electronic device. The protective battery case can include one or more bumpers disposed at least at a lower right inside corner, a lower left inside corner, an upper right inside corner, and an upper left inside corner of the protective battery case such that the one or more bumpers are configured to abut against at least a lower right corner, a lower left corner, an upper right corner, and an upper left corner of the mobile electronic device. A front opening of the protective battery case can be configured such that a display of the mobile electronic device is visible through the front opening.

The battery can be disposed inside the back wall, and the battery can be configured to be behind the back side of the mobile electronic device. The protective battery case can be configured to house a smartphone. The protective battery case can have an external shape that generally corresponds to an external shape of the mobile electronic device (e.g., the smartphone).

The one or more bumpers can extend across at least about 50 percent of the side perimeter of the inside of the protective battery case. The one or more bumpers can include an elastomeric material. The one or more bumpers can have concave inward facing surfaces.

Various embodiments disclosed herein can relate to a protective battery case for use with a mobile electronic device. The protective battery case can include a battery, a back wall configured to extend across at least a portion of a back of the mobile electronic device, a bottom wall configured to extend along at least a portion of a bottom of the mobile electronic device, a top wall configured to extend along at least a portion of a top of the mobile electronic device, a right side wall configured to extend along at least a portion of a right side of the mobile electronic device, a left side wall configured to extend along at least a portion of a left side of the mobile electronic device, and a front opening through which a display of the mobile electronic device is visible when the mobile electronic device is in the protective battery case. The protective battery case can include a device interface configured to electrically couple to a corresponding interface on the mobile electronic device when the mobile electronic device is in the protective battery case. The device interface can be electrically coupled to the battery and can be configured to deliver electrical power from the battery to the mobile electronic device. The protective battery case can include a charging interface configured to receive electrical power and electrically coupled to the battery for charging the battery. The protective battery case can include one or more bumpers configured to abut against the mobile electronic device when the mobile electronic device is in the protective battery case. The one or more bumpers can be configured to support the top of the mobile electronic device, the right side of the mobile electronic device, the left side of the mobile electronic device, and the bottom of the mobile electronic device.

The one or more bumpers can have concave inward facing surfaces. The one or more bumpers can cover at least a portion of a lower right inside corner, at least a portion of a lower left inside corner, at least a portion of an upper right inside corner, and/or at least a portion of an upper left inside corner of the protective battery case. The one or more bumpers can extend across at least about 50 percent of the side perimeter of the inside of the protective battery case. The one or more bumpers can include an elastomeric material.

The battery can be disposed inside the back wall, and the battery can be configured to be behind the back side of the mobile electronic device. The protective battery case can be configured to house a smartphone, and the protective battery case can have an external shape that generally corresponds to an external shape of the mobile electronic device (e.g., the smartphone).

BRIEF DESCRIPTION OF THE DRAWINGS

The following drawings and the associated descriptions are provided to illustrate example embodiments of the present disclosure and do not limit the scope of the claims.

DETAILED DESCRIPTION OF CERTAIN EMBODIMENTS

Figure 1:
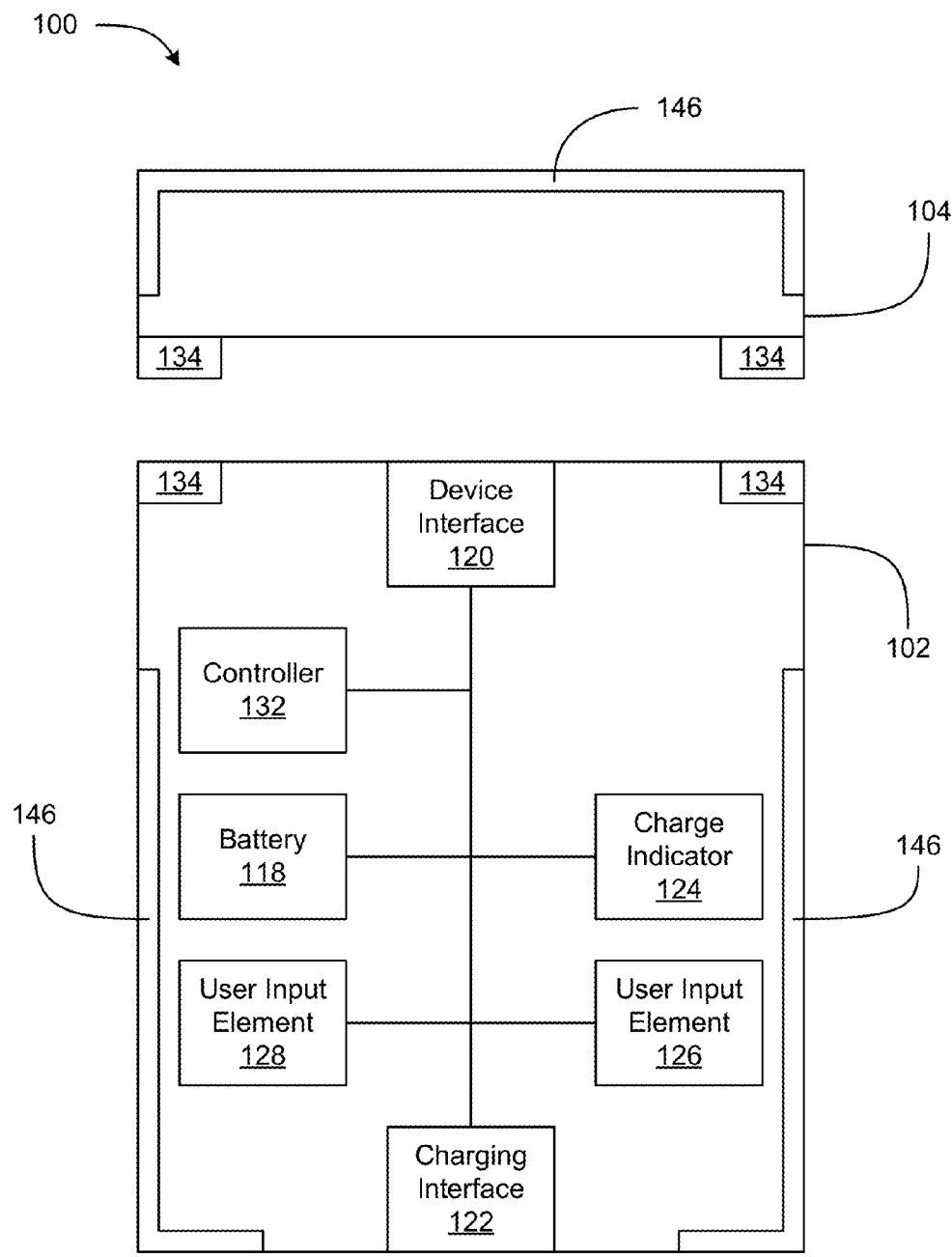
FIG. 1 is a schematic view of an example embodiment of a battery case for use with a mobile electronic device.
Figure 2:
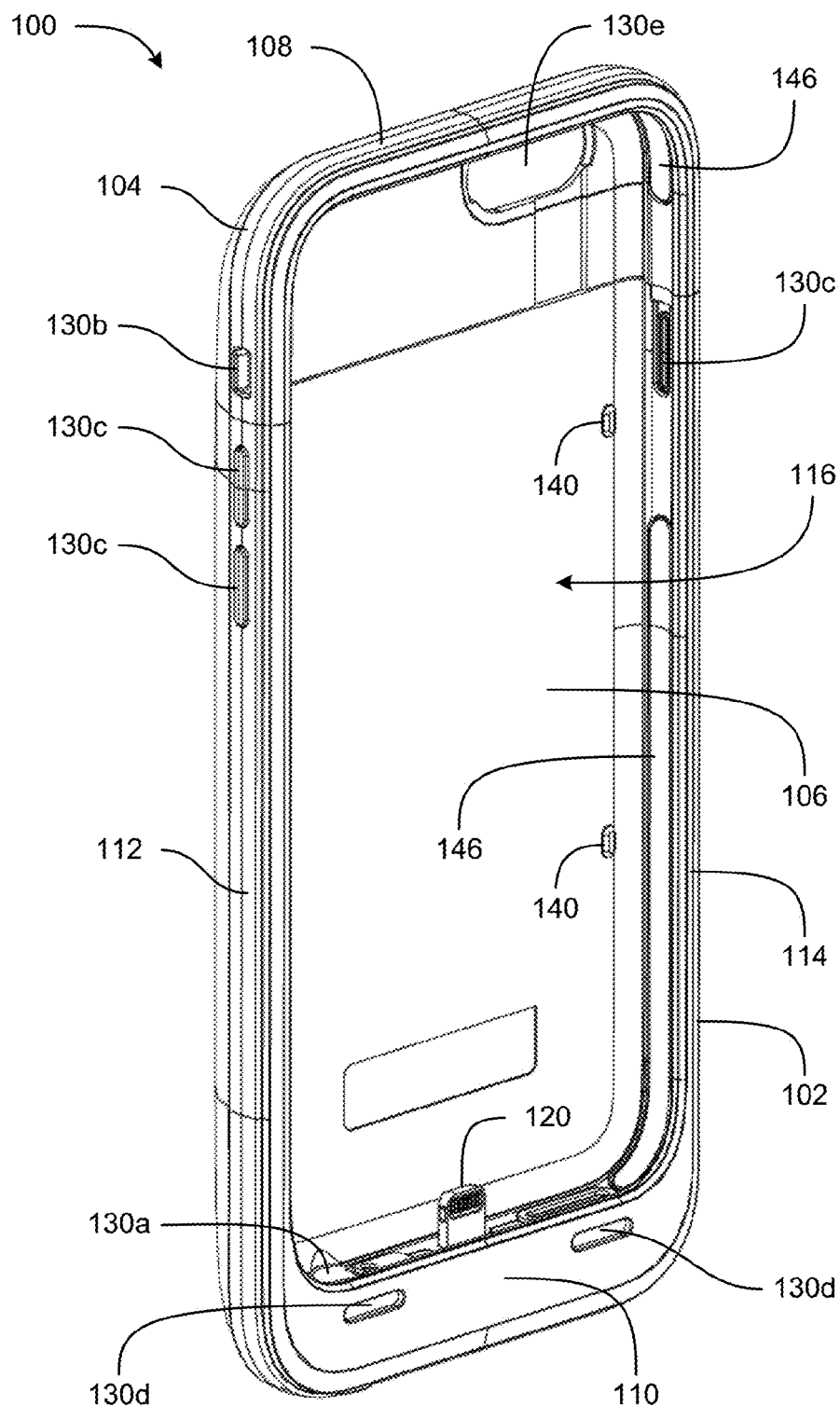
FIG. 2 is a front perspective view of an example embodiment of a battery case in a closed configuration.
Figure 3:
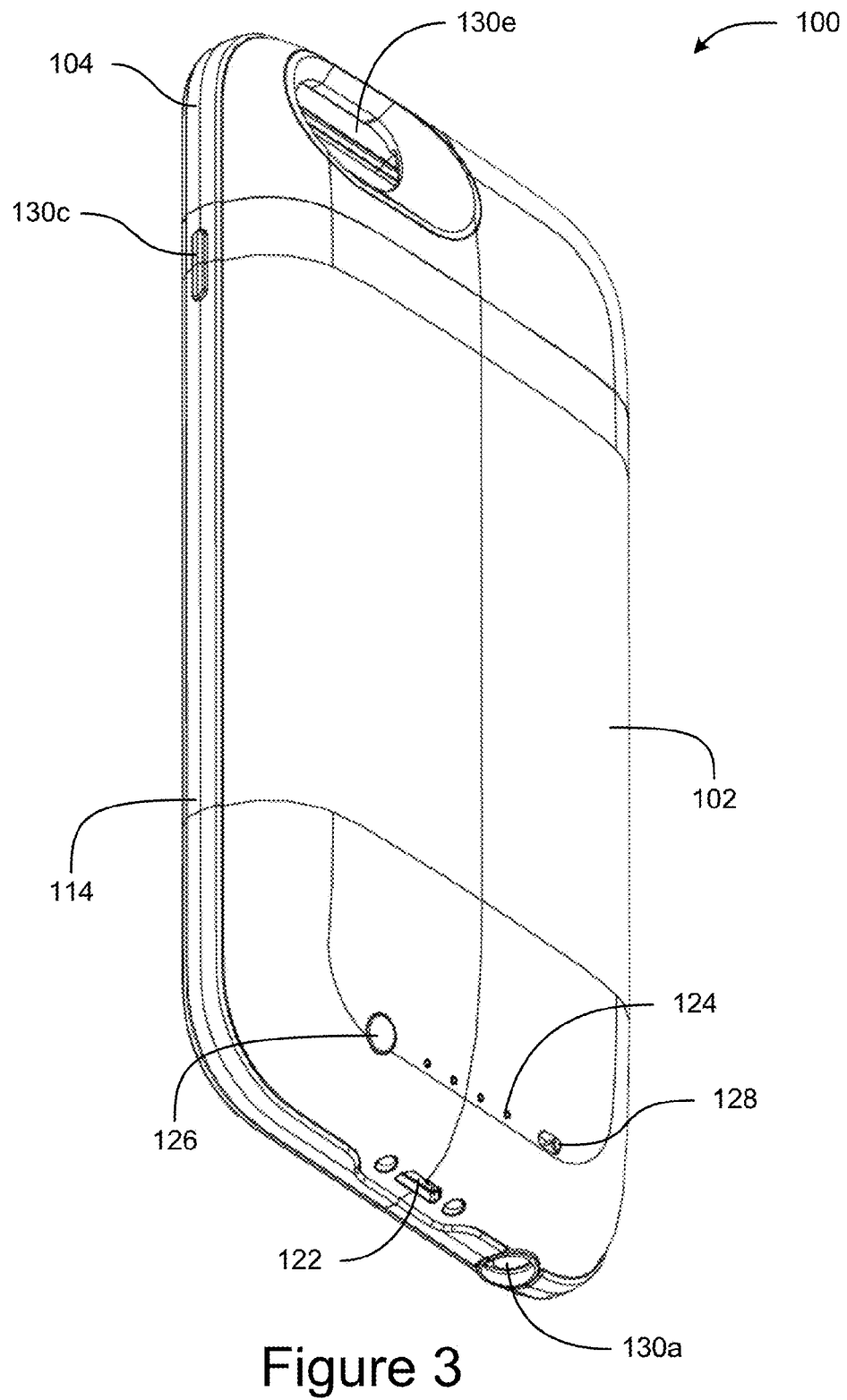
FIG. 3 is a rear perspective view the battery case of FIG. 2 in the closed configuration.
Figure 4:
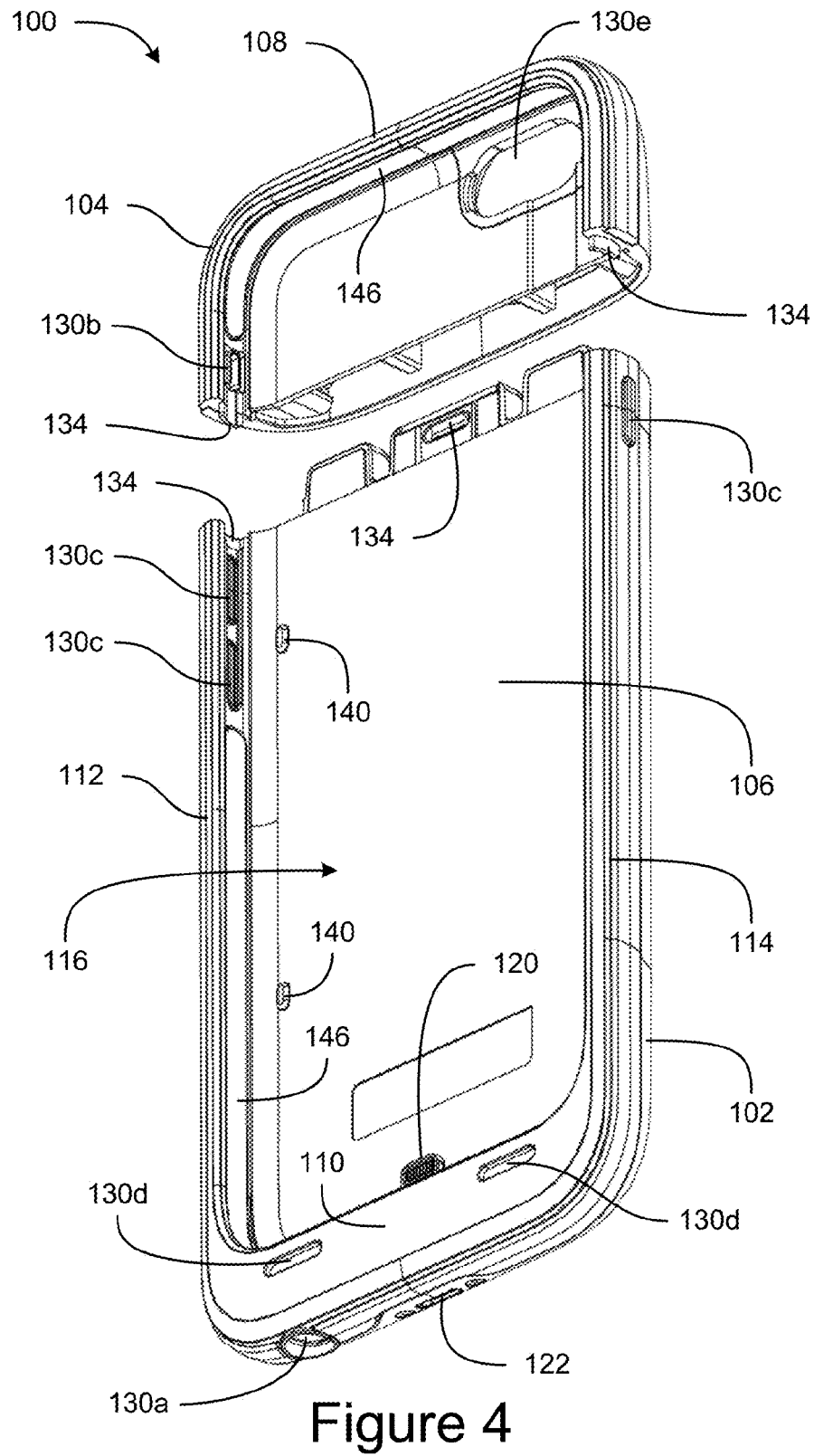
FIG. 4 is a front perspective view of the battery case of FIG. 2 in an open configuration.
Figure 5:
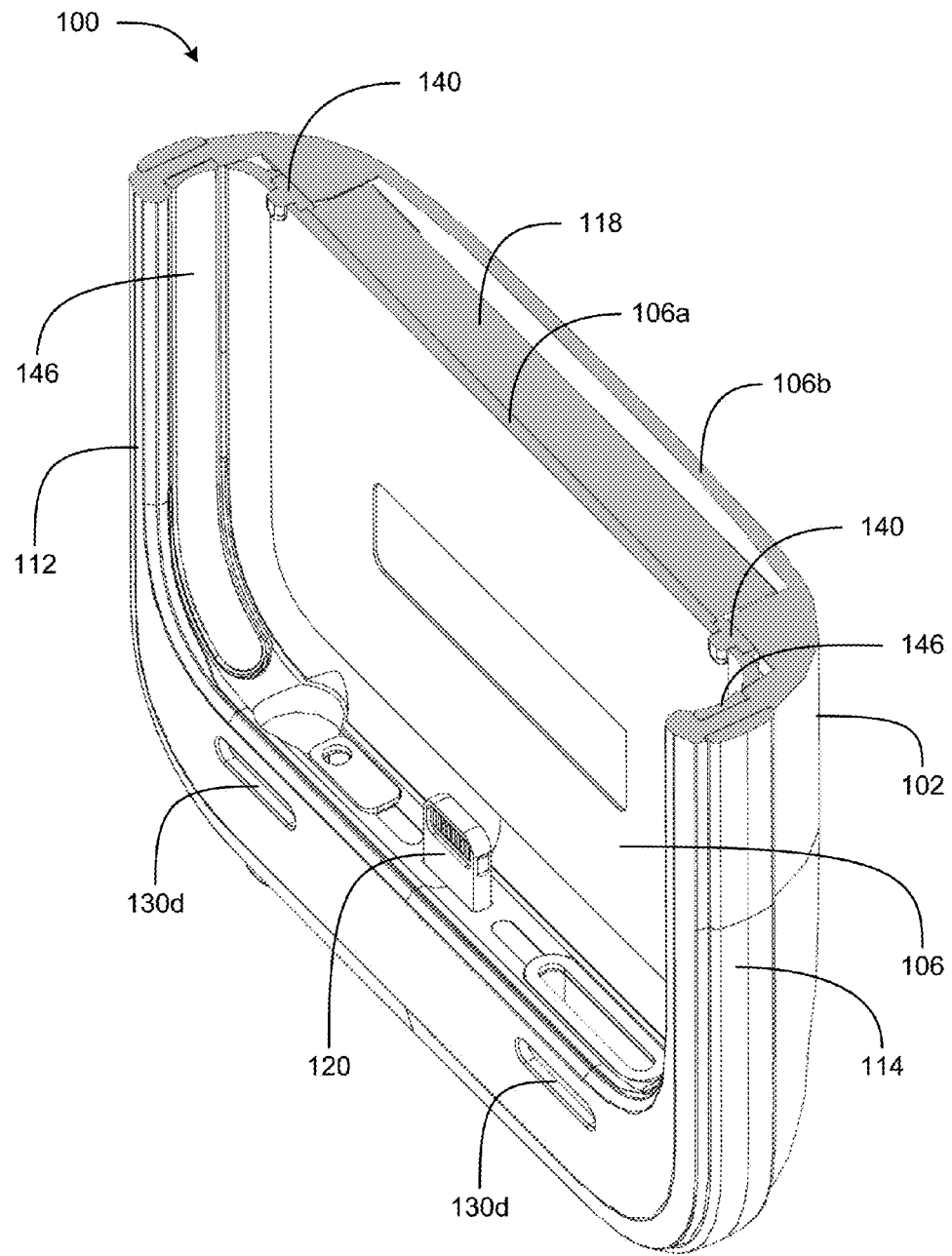
FIG. 5 is a cross-sectional view of the battery case of FIG. 2.

FIG. 1 is a schematic view of an example embodiment of a battery case 100 for use with a mobile electronic device. FIG. 2 is a front perspective view of an example embodiment of a battery case 100 in a closed configuration. FIG. 3 is a rear perspective view the battery case 100 of FIG. 2 in the closed configuration. FIG. 4 is a front perspective view of the battery case of FIG. 2 in an open configuration. FIG. 5 is a cross-sectional view of the battery case 100 of FIG. 2.

The battery case 100 (e.g., a protective case) can include a first case portion 102 and a second case portion 104, which can be configured to removably couple together. In the open configuration, the battery case 100 can permit a mobile electronic device (e.g., a cell phone such as an iPhone®, other smartphone, or tablet computer) to be inserted into, and/or removed from, the battery case 100. In the closed configuration, the battery case 100 can be configured to secure the mobile electronic device in place inside the battery case 100. The battery case 100 can provide protection to the mobile electronic device that is disposed therein.

The battery case 100 can include a back wall 106 that is configured to extend across a back side of the mobile electronic device when the mobile electronic device is in the battery case 100. The battery case 100 can include a top wall 108 that is configured to extend across a top side of the mobile electronic device when the mobile electronic device is in the battery case 100. The battery case 100 can include a bottom wall 110 that is configured to extend across a bottom side of the mobile electronic device when the mobile electronic device is in the battery case 100. The battery case 100 can include a left-side wall 112 that is configured to extend across a left side of the mobile electronic device when the mobile electronic device is in the battery case 100. The battery case 100 can include a right-side wall 114 that is configured to extend across a right side of the mobile electronic device when the mobile electronic device is in the battery case 100. The battery case 100 can include a front opening 116 through which a display (e.g., a touchscreen configured to receive a user input such as a touch input via a finger(s) or hand(s)) of the mobile electronic device is visible when the mobile electronic device is in the battery case 100.

The battery case 100 can include a battery 118, which can be a supplemental battery different than a battery in the mobile electronic device. The battery 118 can be disposed inside the back wall 106, for example, such that the battery 118 is disposed directly rearward of the mobile electronic device when the mobile electronic device is in the battery case 100. By way of example, the battery 118 can be seen in the cross-sectional view of FIG. 5. The back wall 106 of the battery case 100 can include a front portion 106a (e.g., configured to be positioned closer to the mobile electronic device) and a back portion 106b (e.g., configured to be position further from the mobile electronic device), with a cavity disposed between the front portion 106a and the back portion 106b. The battery 118 can be disposed inside the cavity between the front portion 106a and the back portion 106b. In some embodiments, other electrical components (e.g., one or more processors, controllers, circuits, printed circuit boards, wires) can be disposed in the cavity between the front portion 106a and the back portion 106b. Various electrical components can be disposed in the bottom wall 110, for example, such as to be positioned under a bottom side of the mobile electronic device. The battery 118 can be used to provide electrical power to the mobile electronic device, such as to recharge the battery of the mobile electronic device, as described herein.

The battery case 100 can include a device interface 120, which can be configured to interface with an interface on the mobile electronic device. For example, the device interface 120 can be a Lightning™ connector, a Micro-USB connector, or other type of electrical connector, which can be configured to engage a corresponding Lightning™ port, Micro-USB port, or other electrical port on the mobile electronic device. The device interface 120 can be electrically coupled to the battery 118 (e.g., via electrical circuitry inside the battery case 100) so that electrical power from the battery 118 can be transferred to the mobile electronic device via the device interface 120. In some embodiments, the device interface 120 can be an electrical connector that extends upward from the bottom wall 110 of the battery case 100, although other locations can be used, such as extending inward from the left-side wall 112 or the right-side wall 114. The device interface 120 can be an internal interface disposed on an inside of the battery case 100. In some embodiments, the device interface 120 can be an electrical connector that is positioned on a flexible electrical cable such that the electrical connector can be positioned at various different orientations. In some embodiments, the device interface 120 can be a wireless charging interface, which can be configured to wirelessly charge the mobile electronic device (e.g., via inductive charging).

The battery case 100 can include a charging interface 122, which can be used to charge the battery 118 of the battery case 100, as described herein. The charging interface 122 can be a Lightning™ port, a Micro-USB port, or other electrical port that is configured to receive a corresponding Lightning™ connector, Micro-USB connector, or other electrical connector that can deliver electrical power (e.g., from a power source such as a wall outlet or external battery). The charging interface 112 can be electrically coupled to the battery 118 (e.g., via electrical circuitry inside the battery case 100) so that electrical power can be delivered from the charging interface 122 to the battery 118, such as for recharging the battery 118. In some embodiments, the charging interface 122 can be a wireless charging interface configured to receive wireless charging signals for charging the battery 118 (e.g., via inductive charging). In some embodiments, the battery case 100 can be configured to use electrical power received by the charging interface 120 to charge the mobile electronic device first and to charge the battery 118 of the battery case 100 when the mobile electronic device is fully charged or when there is surplus electrical power not being used by the mobile electronic device.

The charging interface 122 can be an external interface disposed on an outside of the battery case 100. The charging interface 122 can be disposed on a bottom side of the battery case 100, such as generally opposite the device interface 120, although the charging interface 122 can be positioned at other locations such as on the right external side or the left external side of the battery case 100. The charging interface 122 can be electrically coupled to the device interface 118 (e.g., via electrical circuitry inside the battery case 100) so that electrical power can be delivered from the charging interface 122 to the device interface 120, such as for passing electrical power through the battery case 100 to the mobile electronic device. In some embodiments, the battery case 100 can be configured to use electrical power received by the charging interface 120 to charge the mobile electronic device first and to charge the battery 118 of the battery case 100 when the mobile electronic device is fully charged or when there is surplus electrical power not being used by the mobile electronic device.

The battery case 100 can include a charge indicator 124, which can be configured to indicate a charge level of the battery 118. The charge indicator 124 can include a plurality of lights, such as light emitting diodes (LEDs), and the number of lights that are illuminated can indicate the amount of charge that the battery 118 has. For example, four lights can be used and one illuminated light can correspond to about 25% charge, two lights can correspond to about 50% charge, 3 illuminated lights can correspond to about 75% charge, and four illuminated lights can correspond to about 100% charge. In some embodiments, the charge indicator can use different colors, the intensity of light, or a display with a text or image representation to indicate the charge level of the battery 118.

The battery case 100 can include a user input element 126, such as a button. The charge indicator 124 can provide an indication of the battery charge level in response to input received by the user input element 126. For example, the lights of the charge indicator 124 can be turned off until the user provides input to the user input element 126 (e.g., by pushing the button), and in response to the input one or more of the lights of the charge indicator 124 can illuminate for a time to communicate the battery charge level information.

The battery case 100 can include a user input element 128, which can be used to turn the charging from the battery 118 to the mobile electronic device on and/or off. In some embodiments, the user input element 128 can be a switch (e.g., a sliding or push-down switch), which can have an "on" setting and an "off" setting. When the switch is at the "on" setting, the battery case 100 can deliver electrical power from the battery 118 to the mobile electronic device, such as via the device interface 120. When the switch is at the "off" setting, the battery case 100 does not deliver electrical power from the battery 118 to the mobile electronic device. Accordingly, the user input element 128 can enable the user to control when the battery case 100 charges the mobile electronic device. Various other types of user input elements 128 can be used to control the charging, such as, for example, a button that can be the same button can be used for the user input element 126 that controls the charge indicator 124 and for the user input element 128 that controls the charging. For example, the button can be pressed or held down for a first, relatively shorter time (e.g., less than two seconds) to operate the charge indicator 124, and the button can be pressed or held down for a second, relatively longer time (e.g., more than two seconds) to start or stop the charging. In some embodiments, the battery case 100 can provide output to the user to indicate that the charging has started or stopped (e.g., by flashing lights of the charge indicator 124).

The battery case 100 can be configured to not interfere with normal operation of the mobile electronic device when in the battery case 100. For example, the front opening 116 can permit viewing and/or providing input to the display (e.g., touchscreen) of the mobile electronic device. The battery case 100 can include one or more features (e.g., openings, button covers, and/or switch covers) that are configured to provide access to one or more corresponding features (e.g., buttons, ports, and/or switches) on the mobile electronic device. For example, an opening 130*a* through a wall of the battery case 100 can be disposed to align with an input port (e.g., a headphone jack) on the mobile electronic device. An opening 130*b* through a wall of the battery case 100 can be disposed to align with a button or switch (e.g., a mute switch) on the mobile electronic device to enable a user to operate the button or switch through the opening 130*b*. Button covers 130*c* can be disposed to align with buttons (e.g., volume buttons and/or an on/off button) on the mobile electronic device to enable a user to operate the buttons via the button covers. In some embodiments, the battery case 100 can include a switch cover that is configured to interface with a switch on the mobile electronic device to operate the switch. One or more openings 130*d* can be disposed to transfer sound from a speaker on the mobile electronic device out of the battery case 100 and/or to transfer sound to a microphone on the mobile electronic device. A camera opening 130*e* can be positioned (e.g., through the back wall 106) to align with a camera and/or camera flash on the mobile electronic device so that the camera of the mobile electronic can operate while the mobile electronic device is in the battery case 100.

The battery case 100 can have an external shape that generally corresponds to the external shape of the mobile electronic device. Accordingly, a battery case 100 designed for use with a smartphone can have an external shape that generally corresponds to the external shape of the smartphone. Accordingly, the battery case 100 with the smartphone therein can be used in the same manner as the smartphone without the battery case 100. For example, the battery case 100 with the smartphone therein can be placed in a user's pocket, can be held in a single hand with the thumb operating the touchscreen, can comfortably be held to the user's face when talking on the phone, etc.

The battery case 100 can be configured to transfer data to and/or from the mobile electronic device while the mobile electronic device is in the battery case. Accordingly, the mobile electronic device can sync with or otherwise communicate with an external computing device while in the battery case 100. For example, a cable can connect the external computing device to the charging interface 122 on the battery case 100. Data can be sent from the external computing device via the cable to the charging interface 122, and the charging interface 122 can be electrically coupled to the device interface 120 (e.g., via electrical circuitry in the battery case 100) such that the data can be transferred to the mobile electronic device via the device interface 120. Data from the mobile electronic device can be received by the device interface 120, can be transferred to the charging interface 122, and can be output from the charging interface 122 to the external computing device via the cable. Although the discussion above describe data being transferred to and/or from the battery case via the same charging interface 122 that is used to receive electrical power, in some embodiments, the battery case 100 can include a data interface (e.g., an electrical port or connector configured to receive data) that is different than the charging interface 122.

The battery case 100 can include a controller 132, which can be used to implement various features and processes discussed herein. The controller 132 can include one or more computing devices (e.g., computer processors). The controller 132 can be implemented using one or more general purpose computer processors, which can be configured to execute computer-executable instructions that can be stored on memory (e.g., non-transitory memory that is not shown in FIGS. 1-5) to implement various features and processes discussed herein. In some embodiments, the controller 132 can include one or more specialized computing devices (e.g., integrated circuits) which can be configured to implement various features and processes disclosed herein. The controller 132 can be configured to control the transfer of electrical power and/or data to and/or from the mobile electronic device and/or an external computing device, to control the charge indicator 124, to control charging of the battery 118, etc.

The battery case 100 can include a housing that can provide protection to a mobile electronic device that is disposed in the battery case 100. The battery case 100 can be configured to permit the mobile electronic device to be removably inserted into the battery case 100 and to be removed from the battery case 100. In some embodiments, the device interface 120 can couple to a corresponding interface (e.g., an electrical port) on the mobile electronic device when the mobile electronic device is inserted into the battery case 100. In the closed configuration, the first case portion 102 and the second case portion 104 can removably couple, connect, and/or interface together to secure the mobile electronic device in the battery case 100. In the open configuration, the first case portion 102 and the second case portion 104 can be configured to enable the mobile electronic device to be removed from the battery case 100 and/or inserted into the battery case. One or both of the first case portion 102 and the second case portion 104 can include engagement mechanisms 134 configured to removably couple the first case portion 102 to the second case portion 104. The engagement mechanisms 134 can include snap fit elements, corresponding slots and protrusions, friction fit elements, clasps, etc.

By way of example, with reference to FIGS. 2-5, in some embodiments, the first case portion 102 can be a lower case portion that includes the device interface 120. The first case portion 102 (e.g., the lower case portion) can have an open top side, as can be seen in FIG. 4, which can enable the mobile electronic device to slide into the first case portion 102. The lower case portion can include the bottom wall 110, a lower portion of the left-side wall 112, a lower portion of the right-side wall 114, and/or a lower portion of the back wall 106. The second case portion 104 can be an upper case portion that can removably couple to the lower case portion to secure the mobile electronic device in the battery case 100. The upper case portion can be detached from the lower case portion to allow the mobile electronic device to be removed from the battery case 100. The upper case portion can include the top wall 108, an upper portion of the left-side wall 112, an upper portion of the right-side wall 114, and/or an upper portion of the back wall 106. A seam between the upper case portion and the lower case portion can extend across portions of the battery case 100, such as, for example, across the back of the battery case 100, across a front of the back wall 106, across the left-side wall 112, and/or across the right-side wall 114. In some embodiments, the lower case portion can form a first open-polygon shape (e.g., a rectangle with rounded corners and an open top side), the upper case portion can form a second open-polygon shape (e.g., a rectangle with rounded corners and an open bottom side), and the first and second open-polygon shapes can align together when the battery case 100 is in the closed configuration to form a closed-polygon shape (e.g., a rectangle with rounded corners) that defines the front opening 116 through which the display of the mobile electronic device can be visible.

Figure 6:
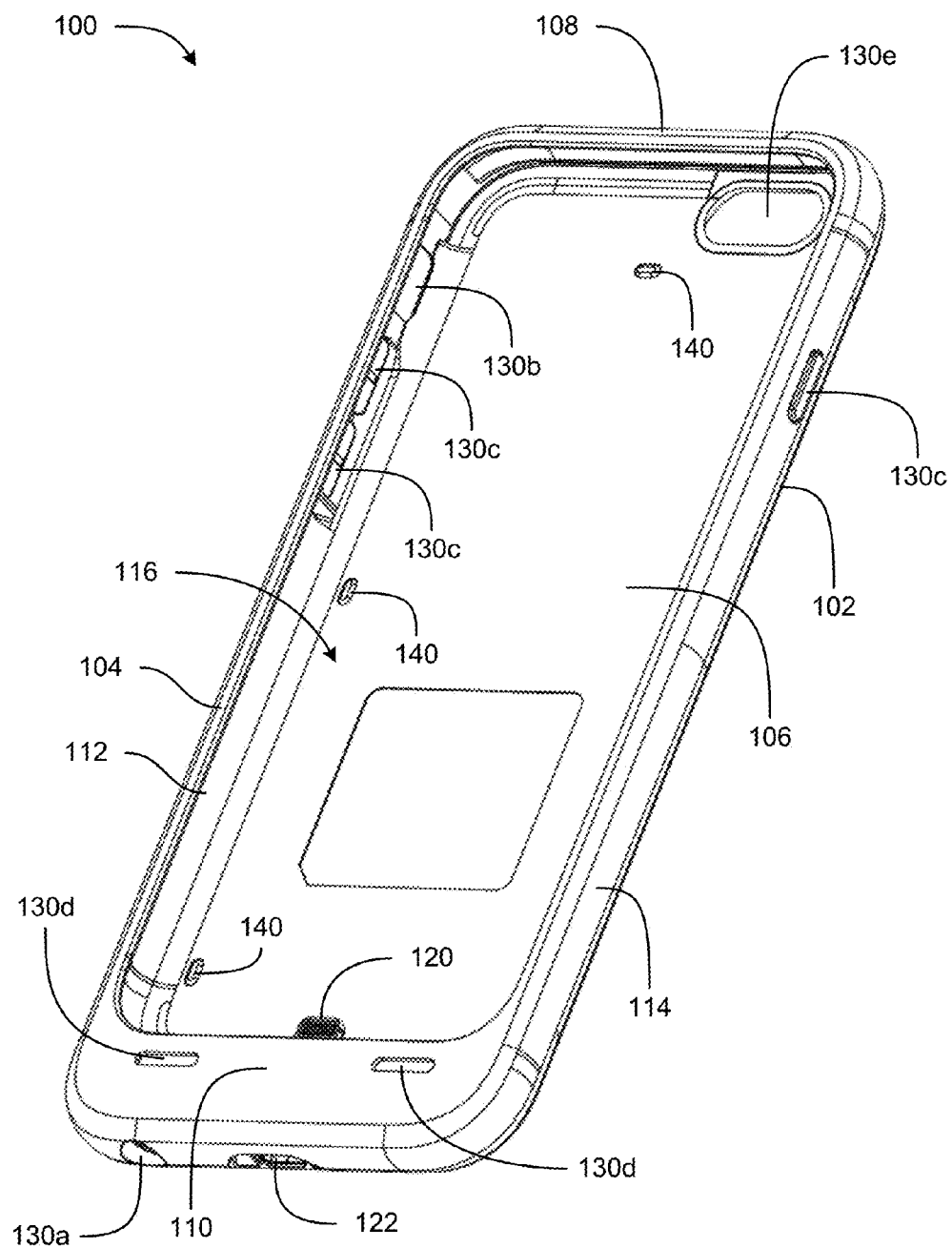
FIG. 6 is a front perspective view of an example embodiment of a battery case in a closed configuration.
Figure 7:
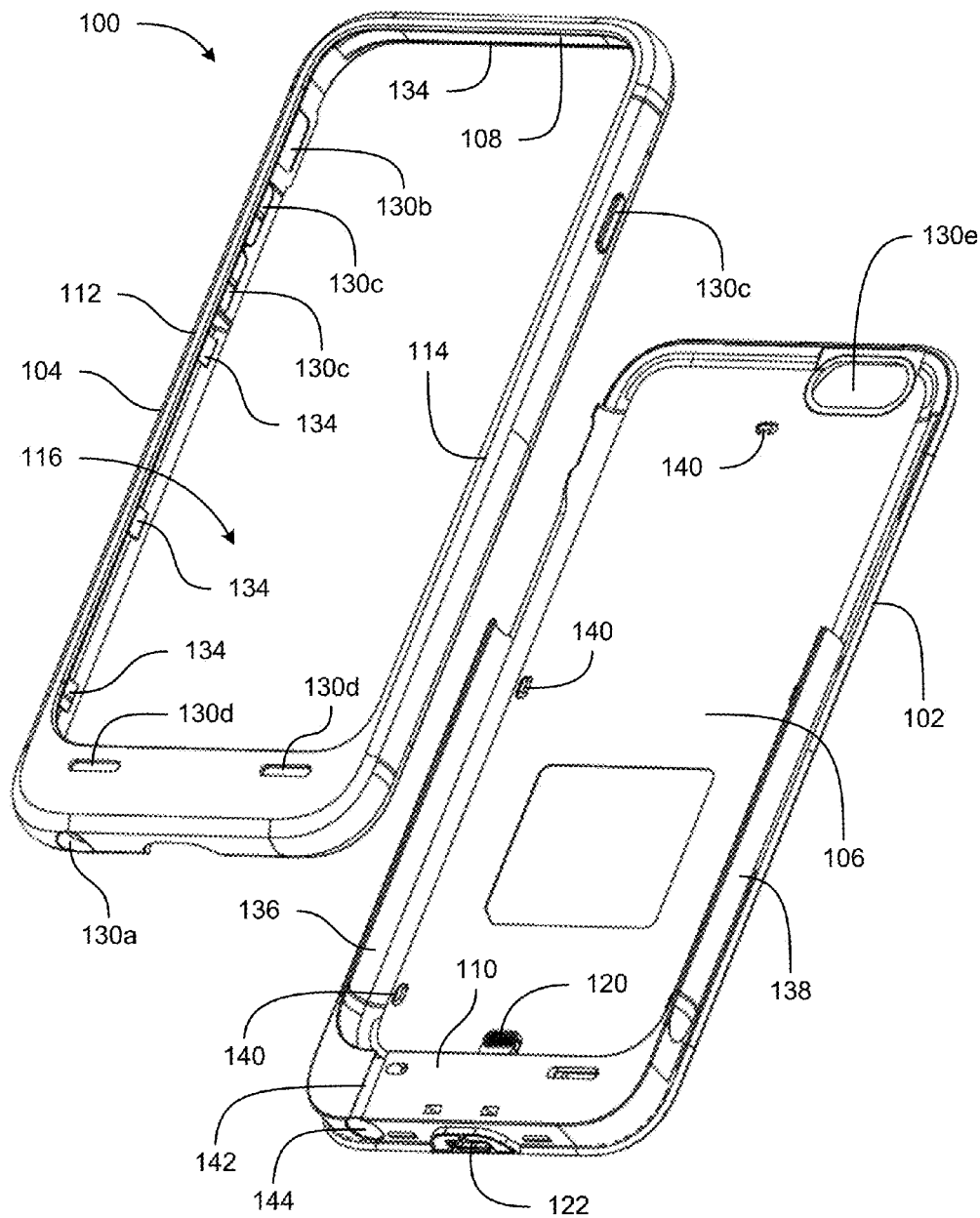
FIG. 7 is a front perspective view of the battery case of FIG. 6 in an open configuration.
Figure 8:
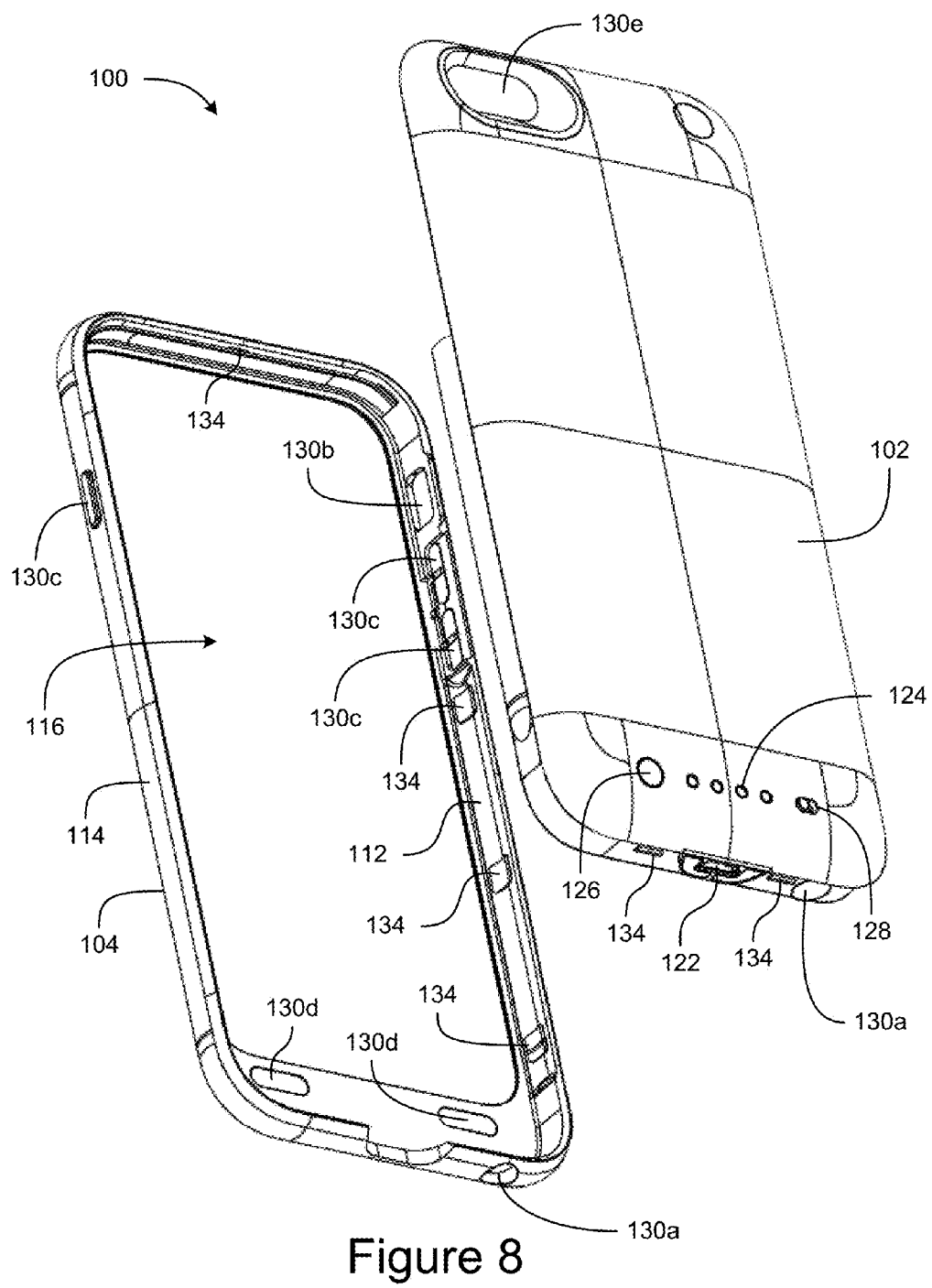
FIG. 8 is a rear perspective view of the battery case of FIG. 6 in the open configuration.

The battery case 100 can have various other configurations. For example, with reference to FIGS. 6-8, in some embodiments, the first case portion 102 can be a rear case portion and the second case portion 104 can be a front case portion. FIG. 6 is a front perspective view of an example embodiment of a battery case 100 in a closed configuration. FIG. 7 is a front perspective view of the battery case 100 of FIG. 6 in an open configuration. FIG. 8 is a rear perspective view of the battery case 100 of FIG. 6 in the open configuration. Various features described in connection with the battery case of FIGS. 2-5 can be implemented similarly in the battery case of FIGS. 6-8, and vice versa. The rear case portion can include the back wall 106 and at least a portion of the bottom wall 110. The rear case portion can include an open top side so that the mobile electronic device can be inserted into the rear case portion when the battery case 100 is in the open configuration. In some embodiments, the battery case 100 does not include a seam across the back of the battery case 100. The second case portion 104 can be a front case portion that is configured to removably couple to the rear case portion after the mobile electronic device is inserted into the rear case portion to secure the mobile electronic device in the battery case 100. The front case portion can be detached from the rear case portion to allow the mobile electronic device to be removed from the battery case 100. The front case portion can include at least a portion of the top wall 108, at least a portion of the bottom wall 110, at least a portion of the left-side wall 112, and/or at least a portion of the right-side wall 114. The front case portion can define a closed-polygon shape (e.g., a rectangle with rounded corners) that defines the front opening 116 through which the display of the mobile electronic device is visible when the mobile electronic device is in the battery case 100. The front case portion can extend around the full perimeter of the battery case 100. The front case portion can include a bottom wall outer portion that can couple to a bottom wall inner portion on the rear case portion, and/or right and left inner side wall portions (e.g., the right side guide 136 and the left side guide 138) that can couple to corresponding right and left outer side wall portions on the front case portion. The battery case 100 can include engagement mechanisms 134 for coupling the bottom portion of the rear case portion to the bottom portion of the front case portion, for coupling the right side portion of the rear case portion to the right side portion of the rear case portion, for coupling the left side portion of the rear case portion to the left side portion of the front case portion, and/or for coupling the top portion of the rear case portion to the top portion of the front case portion. The various engagement mechanisms 134 on multiple different portions of the battery case 100 can facilitate secure coupling of the front case portion to the rear case portion.

Figure 9:
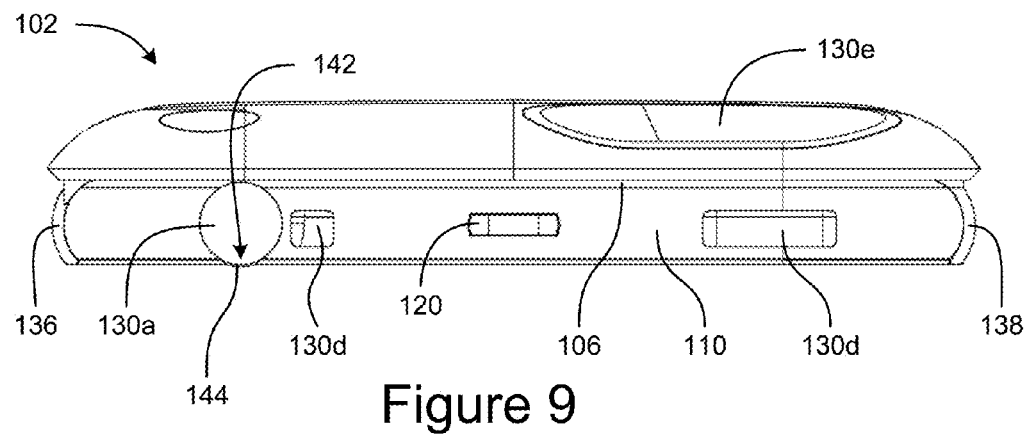
FIG. 9 is a top-down view of a first case portion (e.g., a rear case portion) of the battery case of FIG. 6.

As can be seen in FIG. 7, in some embodiments, the first case portion 102 (e.g., the rear case portion) can include a right side guide 136, which can form part of the left-side wall 112 when the battery case is in the closed configuration and a left side guide 138 that can form part of the right-side wall 114 when the battery case is in the closed configuration. The first case portion 102 can include inner portions of the left-side wall 112 and the right-side wall 114, and the second case portion 104 can include outer portions of the left-side wall 112 and the right-side wall 114. The right side guide 136 and the left side guide 138 can guide the mobile electronic device as it is inserted into the rear case portion, or as it is removed from the rear case portion, such that the mobile electronic device slides along directions parallel to the direction that the device connector 120 extends from the bottom wall 110. FIG. 9 is a top-down view of the first case portion 102 (e.g., the rear case portion). As can be seen in FIG. 9, the right side guide 136 and the left side guide 138 can have concave surfaces that face inward to engage the mobile electronic device. The right side guide 136 and the left side guide 138 can be configured to impede the mobile electronic device from moving forward, away from the back wall 106. Front portions of the right side guide 136 and the left side guide 138 can be configured to wrap partially around the mobile electronic device to hold the mobile electronic device back (e.g., adjacent to the back wall 106).

The right side guide 136 and the left side guide 138 can have a height (e.g., a length extending upward from the bottom wall 110) that is at least as tall as the height of the device connector 120, such that the mobile electronic device can be impeded from moving or pivoting forward until the device interface 120 has fully disengaged from the corresponding interface on the mobile electronic device. The right side guide 136 and the left side guide 138 can have a height that is greater than the height of the device interface 120, such as a height that is at least about 1.25 times, at least about 1.5 times, at least about 2 times, at least about 2.5 times, at least about 3 times, at least about 4 times, at least about 5 times, at least about 7.5 times, at least about 10 times, at least about 15 times, or at least about 20 times the height of the device interface 120. The right side guide 136 and the left side guide 138 can have a height that is less than or equal to about 50 times, less than or equal to about 25 times, less than or equal to about 15 times, less than or equal to about 10 times, less than or equal to about 5 times the height of the device interface 120, although values outside the above-identified ranges can also be used in some implementations. In some embodiments, the right side guide 136 and the left side guide 138 can have a height that is at least about 10%, at least about 15%, at least about 25%, at least about 35%, at least about 50%, less than or equal to about 95%, less than or equal to about 90%, less than or equal to about 80%, less than or equal to about 70%, less than or equal to about 60%, less than or equal to about 50%, less than or equal to about 40%, and/or less than or equal to about 30% of the height of the battery case 100, although values outside these ranges can be used in some implementations.

The left-side wall 112 and the right-side wall 114 of the battery case 100 of FIGS. 2-5 can function similar to the right side guide 136 and the left side guide 138 to restrict movement of the mobile electronic device to a direction that is parallel to the direction of extension of the device interface 120 as the mobile electronic device engages or disengages the device interface 120. Accordingly, the disclosure herein relating to the right side guide 136 and the left side guide 138 can also apply to the left-side wall 112 and the right-side wall 114 of other battery case 100 embodiments (e.g., as shown in FIGS. 2-5).

The battery case 100 can include one or more bumpers 140 on one or more inside surfaces of the battery case 100, and the bumpers 140 can be configured to abut against the mobile electronic device when the mobile electronic device is in the battery case 100. The bumpers 140 can be made of silicone or any other suitable elastomeric and/or soft materials. The bumpers 140 can be configured to provide protection to the mobile electronic device by insulating it from harder materials of the battery case 100 and by providing shock absorption for impacts to the battery case. The bumpers 140 can facilitate achieving a snug fit of the mobile electronic device in the battery case 100 by compensating for minor size differences (e.g., due to manufacturing tolerances or different model sizes) between individual mobile electronic devices. The bumpers 140 can have a desired or predetermined coefficient of static or kinetic friction with the mobile electronic device to substantially prevent or inhibit the mobile electronic device from moving within the battery case 100 and/or out of the battery case 100 until a sufficient force is applied to the mobile electronic device (e.g., a user pulling or pushing the mobile electronic device relative to the battery case 100 to, for example, insert or remove the mobile electronic device into or from the battery case 100). The bumpers 140 can be on the inner-facing side of the back wall 106, on the inner-facing side of the left-side wall 112, on the inner-facing side of the right-side wall 114, on the inner-facing side of the top wall 108, and/or on the inner-facing side of the bottom wall 110, or any combination thereof.

Figure 10:
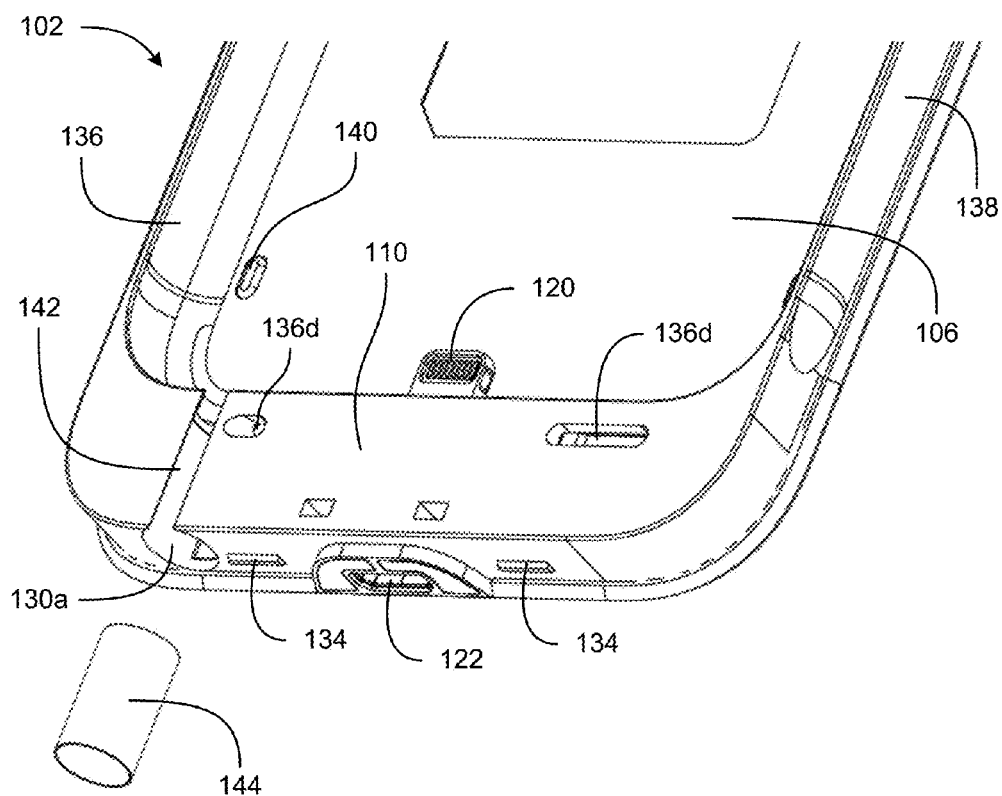
FIG. 10 is a partial exploded view of the first case portion of the battery case of FIG. 6.

In some embodiments, an opening 130a can extend through the bottom wall 110 to align with a feature (e.g., a headphone jack) on the mobile electronic device. In some embodiments, the opening 130a can be formed as a closed cylindrical hole. In some embodiments, a side of the opening 130 can have a gap 142, as can be seen in FIGS. 7 and 10. FIG. 10 is a partial exploded view of the first case portion 102 (e.g., the rear case portion). In some implementations, the portion of the bottom wall 100 that includes the opening 130a can have a thickness that is insufficient to provide a fully enclosed side wall that surrounds the full perimeter of the opening 130a, and the gap 142 can be formed at a front portion of the opening 130a. The gap 142 can be a slot that extends along a vertical direction. An insert piece 144 can be disposed inside the opening 130a. The insert piece 144 can be cylindrical in shape and can have a circular cross-sectional shape. The insert piece 144 can include one or more side walls that fully extend 360 degrees in the horizontal plane (e.g., to form a cylinder with closed side walls). The insert piece 144 can be open at the top and bottom, such that an object (e.g., a head phone jack) can pass through the insert piece 144. The insert piece 144 can be disposed inside the opening 130a, such that the insert piece 144 covers the gap 142 in the opening 130a, which can provide reinforcement to the opening 130a (e.g., to maintain the opening 130a at the desired size), and which can facilitate reliable insertion and removal of an object (e.g., a headphone jack) to and from the opening 130a (e.g., by providing an inner surface to the opening 130a that does not have any gaps or seams).

The insert piece 144 can be rigid (e.g., more rigid relative to the battery case 100) and can be made of metal or rigid plastic or various other suitably rigid materials. The insert piece 144 can be formed separately from the housing piece that includes the opening 130a, and the insert piece 144 can be inserted into the opening 130a during assembly. In some embodiments, a lip can be disposed at an end of the opening 130a (e.g., at the top end of the opening 130a) to impede over-insertion of the insert piece 144. The insert piece 144 can be secured in the opening 130a by an adhesive, by a friction fitting, by a snap mechanism, by a clamp, or by any other suitable securing mechanism, including adhesives. As can be seen in FIG. 9, the insert portion 144 can extend forward (e.g., downward in the orientation of FIG. 9) past the front edge of the opening 130a, past the gap 142, and/or past the front edge of the housing piece that surrounds the opening 130a.

The battery case 100 can include side bumpers 146 on one or more inside surfaces such that the side bumpers 146 are configured to abut against one or more sides (e.g., the top side, bottom side, left side, and/or right side, or any combination thereof) of the mobile electronic device. The disclosure relating to the bumpers 140 can apply to the side bumpers 146. The one or more side bumpers 146 can be configured to support the mobile electronic device on all four sides of the mobile electronic device. For example, in some embodiments a side bumper 146 can extend around the full perimeter of the inside of the battery case 100. In some embodiments, the one or more side bumpers 146 can include cutouts, recesses, or openings that align with features on the inside side surfaces of the battery case 100 (e.g., the device interface 120, the openings 130a and 130b, and/or the button covers 130c and 130d), or the side bumper 146 can be shaped to go around or otherwise avoid the features on the inside side surfaces of the battery case 100. The one or more side bumpers 146 can cover at least about 10%, at least about 20%, at least about 30%, at least about 40%, at least about 50%, at least about 60%, at least about 70%, at least about 80%, at least about 90%, less than or equal to about 90%, less than or equal to about 80%, less than or equal to about 70%, less than or equal to about 60%, less than or equal to about 50%, less than or equal to about 40%, less than or equal to about 30%, and/or less than or equal to about 20% of the side perimeter of the inside of the battery case 100, although values outside these ranges can be used in some implementations.

In some embodiments, the one or more side bumpers 146 can be disposed at one or more of the inside/interior corners of the battery case 100. As can be seen in FIG. 2, a side bumper 146 can be disposed at a lower right inside corner of the battery case 100 to support a lower right corner of the mobile electronic device, and a side bumper 146 can be disposed at an upper right inside corner of the battery case to support an upper right corner of the mobile electronic device. As can be seen in FIG. 4, a side bumper 146 can be disposed at a lower left inside corner of the battery case 100 to support a lower left corner of the mobile electronic device, and a side bumper 146 can be disposed at an upper left inside corner of the battery case 100 to support an upper left corner of the mobile electronic device. In some embodiments, a side bumper 146 can extend along at least a portion of an inner right side of the battery case 100 to abut against the right side of the mobile electronic device, a side bumper 146 can extend along at least a portion of an inner left side of the battery case 100 to abut against the left side of the mobile electronic device, a side bumper 146 can extend along at least a portion of an inner top side of the battery case 100 to abut against the top of the mobile electronic device, and/or a side bumper 146 can extend along at least a portion of an inner bottom side of the battery case 100 to abut against the bottom of the mobile electronic device.

As can be seen in FIG. 5, the one or more side bumpers 146 can have a concave surface (relative to the interior of the battery case 100) that faces inward to abut against the mobile electronic device. The concave surface can wrap around to a portion of the front of the mobile electronic device, in some embodiments. The concave surface of the one or more side bumpers 146 can support, protect, and insulate the mobile electronic in the side directions and in forward and/or backward directions as well. For example, if an impact would tend to move the mobile electronic device forward (e.g., away from the back wall 106), the front part of the concave side bumpers 146 can absorb the force driving the mobile electronic device forward.

In some embodiments, the battery case 100 can include a right side bumper 146 configured to extend along a right inner side of the battery case 100, and the right side bumper can cover the right lower inside corner and/or can wrap around to extend partially along a bottom inner side of the battery case 100. The battery case 100 can include a left side bumper 146 configured to extend along a left inner side of the battery case 100, and the left side bumper 146 can cover the left lower inside corner and/or can wrap around to extend partially along a bottom inner side of the battery case 100. The right side bumper 146 and the left side bumper 146 can be on the first case portion 102 (e.g., on the lower case portion). The battery case 100 can include a top side bumper 146 configured to extend along a top inner side of the battery case 100. In some embodiments, the top side bumper 146 can cover the right upper inside corner and/or the left upper inside corner of the battery case 100. In some embodiments, the top side bumper 146 can wrap around to extend partially along a right inner side of the battery case 100 and/or along a left inner side of the battery case 100. The top side bumper 146 can be on the second case portion 104 (e.g., on the upper case portion). Various different configurations are possible. For example, a single, integral bumper element can be used for each of the various side bumper 146 shown and described herein (e.g., the right side bumper, the left side bumper, and/or the top side bumper). In some embodiments, the various side bumpers 146 shown and described herein (e.g., the right side bumper, the left side bumper, and/or the top side bumper) can include a plurality of distinct bumper elements, which can abut each other, or be spaced apart.

Figure 11:
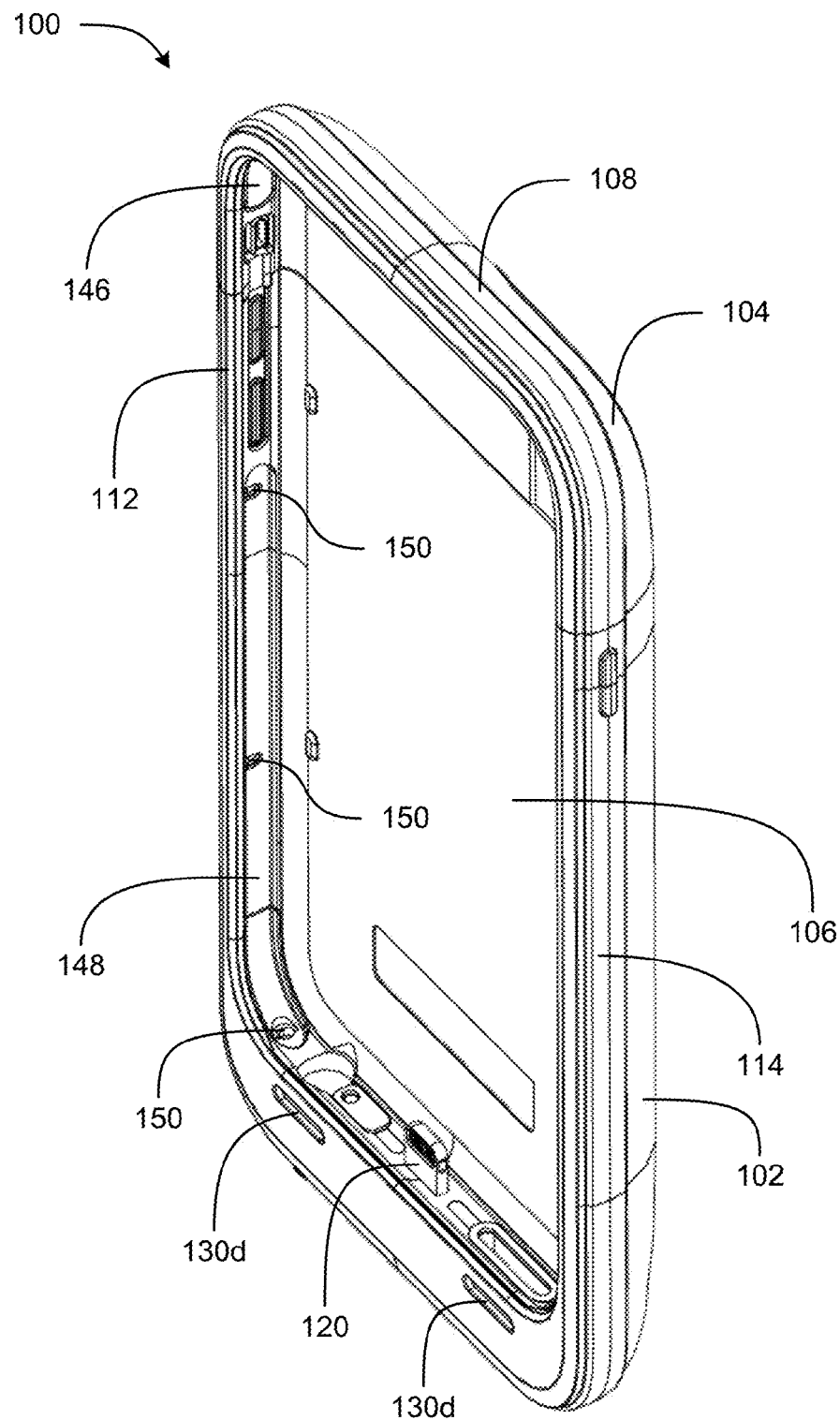
FIG. 11 is a perspective view of an example embodiment of a battery case with a side bumper removed.
Figure 12:
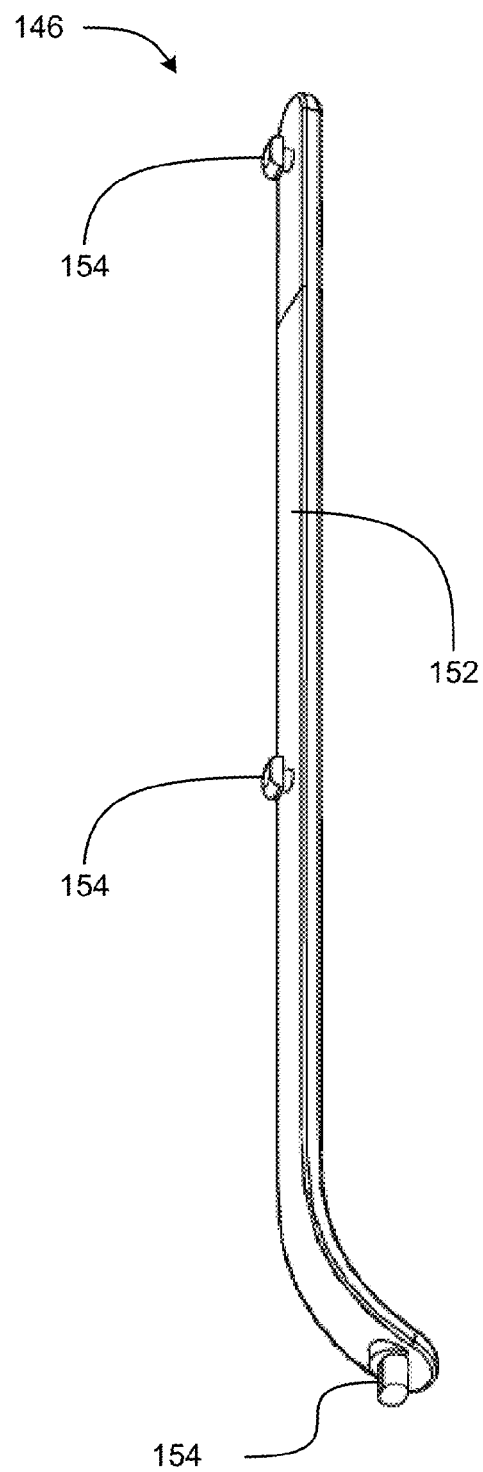
FIG. 12 is a perspective view of the side bumper removed from the battery case of FIG. 11.

FIG. 11 is a perspective view of an example embodiment of a battery case 100 with a side bumper 146 removed. FIG. 12 is a perspective view of the side bumper 146 removed from the battery case 100 of FIG. 11. The housing of the battery case 100 (e.g., the lower case portion in FIG. 11) can include a recess 148 that is shaped to receive the side bumper 146. The side bumper 146 can sit in the recess, such that a portion of the side bumper 146 is recessed down into the recess 148, as can be seen in the cross-sectional view of FIG. 5). The one or more side bumpers 146 can be coupled to the housing by an adhesive, by over-molding, by snap-fit mechanisms, by a friction fitting, by sonic welding, or any other suitable securing mechanism. The housing (e.g., the lower case portion in FIG. 11) can include one or more holes, openings, or cutouts 150 which can facilitate securing of the side bumper 146 to the housing. The side bumper 146 can include a main body portion 152. The side bumper 146 can include one or more protrusions 154 that can be configured to insert into the corresponding one or more holes 150 in the housing, to facilitate coupling of the side bumper 146 to the housing. The one or more protrusions can be T-shaped. The one or more protrusions can have a neck portion and an end portion, and the neck portion can be narrower than the end portion. The corresponding hole 150 in the housing can have a size that is smaller than the end portion. The end portion can compress to pass through the hole 150 and the end portion can decompress to impede the protrusion 154 from being pulled out of the hole 150.

Figure 13:
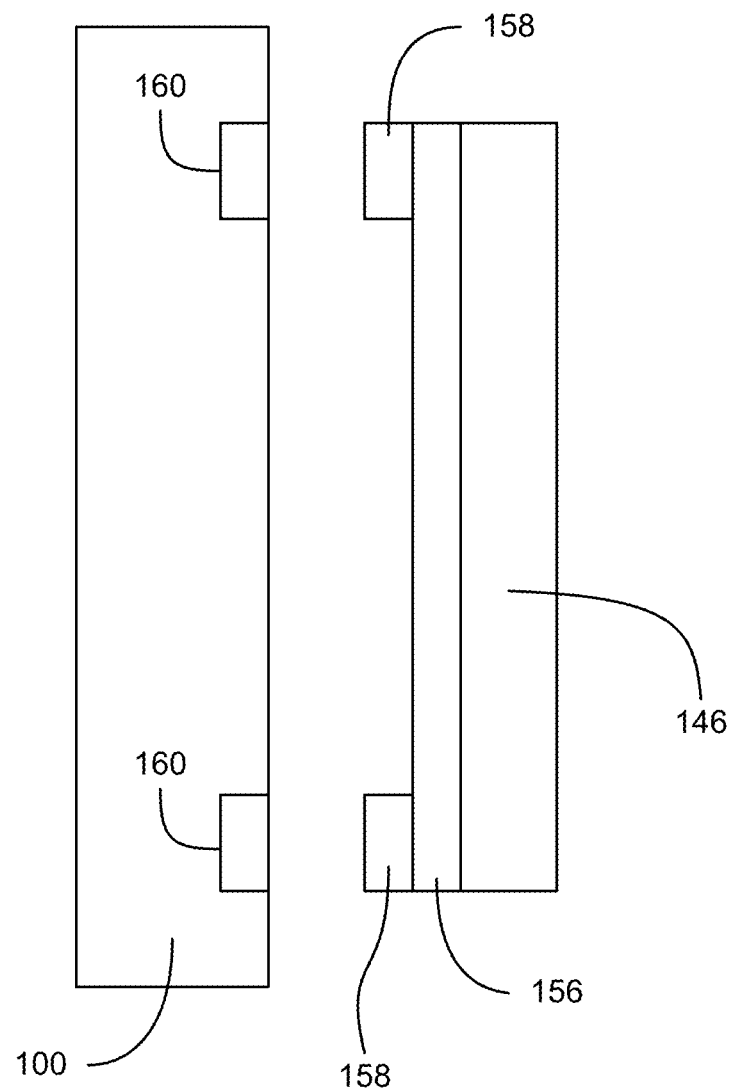
FIG. 13 schematically shows an example embodiment of a side bumper that can be removably coupled to the housing of the battery case.

In some embodiments, the side bumper 146 can be removably secured to the housing. FIG. 13 schematically shows an example embodiment of a side bumper 146 that can be removably coupled to the housing of the battery case 100. The side bumper 146 can be coupled to a base member 156, which can be made of a rigid material (e.g., a rigid plastic), such as using an adhesive, by over-molding, by a friction fitting, by sonic welding, or any other suitable securing mechanism. The base member 156 can include one or more engagement mechanisms 158 that are configured to removably engage one or more corresponding engagement mechanisms 160 on the housing of the battery case 100. The engagement mechanisms 160 can be snap-fit engagement mechanisms, friction-fit engagement mechanisms, clasps, or any other suitable engagement mechanisms. The assembly of the side bumper 146 and the base member 156 can be removably coupled to the housing of the battery case 100, and can be removed or interchanged with other side bumper assemblies, for example to provide different side bumpers with different sizes, different amounts of hardness, or other different features.

Figure 14:
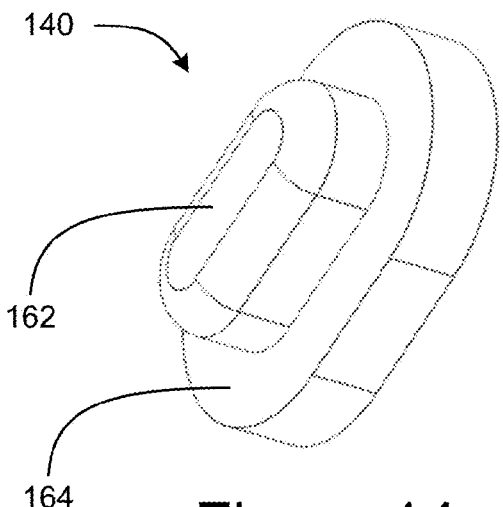
FIG. 14 shows a perspective view of a bumper.

As can be seen in the cross-sectional view of FIG. 5, the rear bumpers 140 can be secured between the front portion 106a and the back portion 106b of the back wall 106. FIG. 14 shows a perspective view of a bumper 140. The bumper 140 can include a main body portion 162 and a securing flange 164. The securing flange 164 can be disposed between the front portion 106a and the back portion 106b of the back wall 106, and the main body portion 162 can extend through a hole in the front portion 106a, such that the main body portion of the bumper 140 extends forward of the back wall 106 so that it can abut against a back of the mobile electronic device (e.g., to prevent the mobile electronic device from directly contacting the back wall 106).

Figure 15:
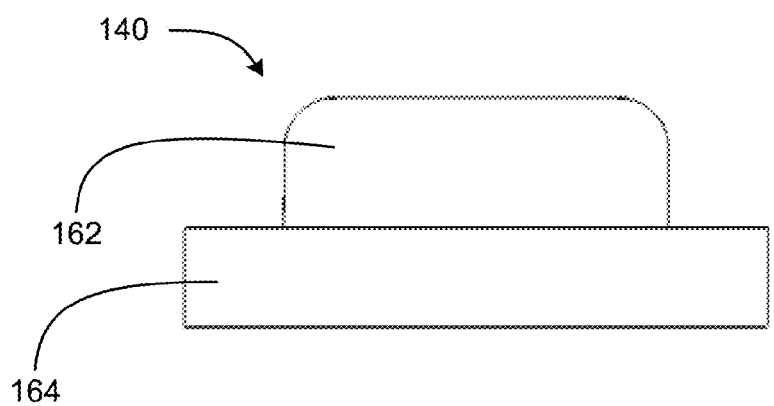
FIG. 15 is a side view of an example embodiment of a bumper having a first height.
Figure 16:
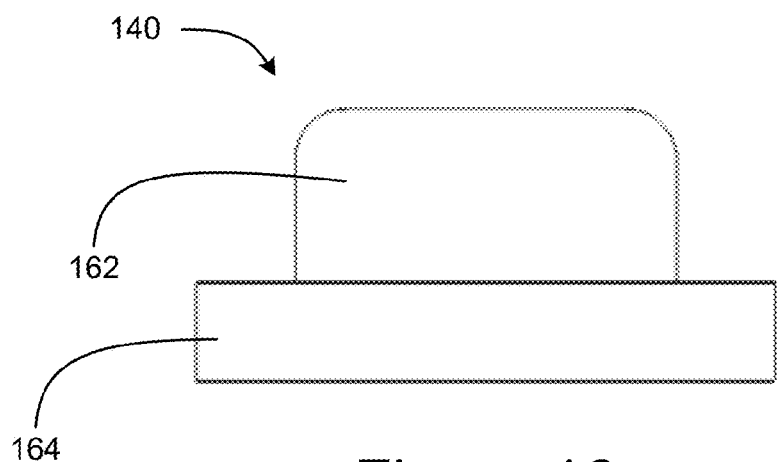
FIG. 16 is a side view of an example embodiment of a bumper having a second height that is larger than the first height.

Different sizes of bumpers 140 can be used. FIG. 15 is a side view of an example embodiment of a bumper 140 having a first height, and FIG. 16 is a side view of an example embodiment of a bumper 140 having a second height that is larger than the first height. Different mobile electronic devices, even of the same model type, can sometimes have somewhat different dimensions (e.g., thickness or height or width), such as due to manufacturing tolerances. Also in some instances a mobile electronic device can be updated to a new model that has only slightly different dimensions than a previous model. The different sizes of bumpers 140 can be used to accommodate between different sizes of mobile electronic devices. For example, two housings for two battery cases can have the same inner dimensions for housing mobile electronic devices but can be configured to hold different sizes of mobile electronic devices by using different bumpers 140. The side bumpers 146 can have different heights to accommodate different sizes of mobile electronic devices as well. The bumpers 140 and 146 can be configured to be removably coupled to the housing of the battery case 100 (e.g., as discussed in connection with FIG. 13) so that they can be interchanged with other bumpers 140 and 146 of different size or having other different properties.

Various other configurations are possible for the battery case 100. For example, in some embodiments, the battery case 100 can include a single-piece housing, instead of the two-piece housing of FIGS. 1-8 that has the first case portion 102 and the second case portion 104. The single-piece housing can include a flexible portion that can be configured to flex to facilitate insertion of the mobile electronic device into the battery case 100 and/or to facilitate removal of the mobile electronic device from the battery case 100. For example, in some embodiments, the top wall 108, the left-side wall 112, and/or the right-side wall 114 can be flexible to bend out of the way during insertion and/or removal of the mobile electronic device into and/or from the battery case 100. In some embodiments, the back wall 106 and/or the bottom wall 110 can be rigid. The battery 118 can be disposed inside the thickness of the back wall 106, for example, such that the battery 118 is disposed directly rearward of the mobile electronic device when the mobile electronic device is in the battery case 100. In some embodiments, a battery case 100 with a single-piece housing can have an open top side, such that the top wall 108 is omitted to facilitate insertion and/or removal of the mobile electronic device into and/or from the battery case 100. In some embodiments, the device interface 120 can be movable to facilitate insertion and/or removal of the mobile electronic device into and/or from the battery case 100. For example, the device interface 120 can pivot forward so that the mobile electronic device can couple to the device interface 120 and the mobile electronic device can be pivoted back into the housing as the device interface pivots back. In some embodiments, the device interface 120 can be on a movable portion that is configured to move (e.g., slide) downward away from the top wall 108 to provide sufficient space between the top wall 108 and the device interface 120 for the mobile electronic device to be inserted into the housing. The movable portion can move (e.g., slide) upward such that the device interface 120 engages the corresponding interface (e.g., electrical port) on the mobile electronic device. For removal of the mobile electronic device, the movable portion can move (e.g., slide) downward to disengage the device interface 120 from the corresponding interface on the mobile electronic device. When moved downward, there can be sufficient space between the top wall 108 and the device interface 120 for the mobile electronic device to be removed from the battery case 100. In some embodiments, the battery case 100 can include two-piece housing, as shown, for example, in FIGS. 1-8. In some embodiments, the housing can include three or more pieces that removably couple together.

Components that are shown or described as being part of the first case portion 102 can be part of the second case portion 104, and vice versa. For example, the battery 118 can be part of the second case portion 104. The first case portion 102 and the second case portion 104 can be configured to electrically couple when in the closed configuration such that electrical power can be transferred between the first case portion 102 and the second case portion 104. For example, to charge the battery in the second case portion 104, electrical power can be received by the charging interface 122 on the first case portion 102, transferred via one or more electrical connectors to the second case portion 104, and be delivered to the battery 118. To charge the mobile electronic device from the battery 118 in the second case portion 104, electrical power from the battery 118 can be delivered via the one or more electrical connectors to the first case portion 102, and can be delivered via the device interface 120 to the mobile electronic device. The various features described in connection with the different embodiments of battery cases 100 can be combined and interchanged into various combinations and sub-combinations. Various features described herein can be omitted. For example, in some embodiments, the right side guide 136 and the left side guide 138, the bumpers 140, and/or various other features described herein can be omitted.

The embodiments discussed herein are provided by way of example, and various modifications can be made to the embodiments described herein. Certain features that are described in this disclosure in the context of separate embodiments can also be implemented in combination in a single embodiment. Conversely, various features that are described in the context of a single embodiment can be implemented in multiple embodiments separately or in various suitable sub-combinations. Also, features described in connection with one combination can be excised from that combination and can be combined with other features in various combinations and subcombinations. Various features can be added to the example embodiments disclosed herein. Also, various features can be omitted from the example embodiments disclosed herein.

The following is claimed:

1. A protective battery case for use with a mobile electronic device, the protective battery case comprising:
a lower case portion comprising:
a battery;
a back wall configured to extend across at least a portion of a back of the mobile electronic device;
a bottom wall configured to extend along at least a portion of a bottom of the mobile electronic device;
a lower right side wall configured to extend along at least a portion of a lower right side of the mobile electronic device;
a lower left side wall configured to extend along at least a portion of a lower left side of the mobile electronic device;
an open top side to facilitate insertion of the mobile electronic device into the lower case portion;
a device interface extending from the bottom wall and configured to electrically couple to a corresponding interface on the mobile electronic device when the mobile electronic device is in the protective battery case, wherein the device interface is electrically coupled to the battery and is configured to deliver electrical power from the battery to the mobile electronic device;
a charging interface configured to receive electrical power and electrically coupled to the battery for charging the battery;
a left side bumper extending along at least a portion of an inside of the lower left side wall and at least a portion of an inside lower left corner of the protective battery case and configured to abut against at least a portion of the lower left side and at least a portion of the lower left corner of the mobile electronic device;
a right side bumper extending along at least a portion of an inside of the lower right side wall and at least a portion of an inside lower right corner of the protective battery case and configured to abut against at least a portion of the lower right side and at least a portion of the lower right corner of the mobile electronic device;
wherein the left side bumper extends at least half way up the inside of the lower left side wall from the inside lower left corner towards the open top side of the lower case portion, and wherein the right side bumper extends at least half way up the inside of the lower right side wall from the inside lower right corner towards the open top side of the lower case portion; and an upper case portion comprising:
- a top wall configured to extend along at least a portion of a top of the mobile electronic device;
- an upper right side wall configured to extend along at least a portion of an upper right side of the mobile electronic device;
- an upper left side wall configured to extend along at least a portion of an upper left side of the mobile electronic device; and
- a top side bumper extending along at least a portion of an inside of the top wall, at least a portion of an inside upper right corner, and at least a portion of an inside upper left corner of the protective battery case and configured to abut against at least a portion of the top, at least a portion of the upper right corner, and at least a portion of the upper left corner of the mobile electronic device;

wherein the lower case portion and the upper case portion are configured to removably couple together to at least partially enclose the mobile electronic device; and wherein a front opening of the protective battery case is configured such that a display of the mobile electronic device is visible through the front opening;

wherein the left side bumper, the right side bumper, and the top side bumper comprise an elastomeric and/or soft material configured to provide impact absorption to protect the mobile electronic device.

2. The protective battery case of claim 1, wherein the battery is disposed inside the back wall such that the battery is configured to be behind the back side of the mobile electronic device.

3. The protective battery case of claim 1, wherein the protective battery case is configured to house a smartphone and wherein the protective battery case has an external shape that generally corresponds to an external shape of the smartphone.

4. The protective battery case of claim 1, wherein the right side bumper, the left side bumper, and the top side bumper comprise an elastomeric material.

5. The protective battery case of claim 1, wherein the left side bumper comprises a single integral bumper element that extends along the at least a portion of the inside of the lower left side wall and the at least a portion of the inside lower left corner of the protective battery case, wherein the right side bumper comprises a single integral bumper element that extends along the at least a portion of the inside of the lower right side wall and the at least a portion of the inside lower right corner of the protective battery case, and wherein the top side bumper comprises a single integral bumper element that extends along the at least a portion of the inside of the top wall, the at least a portion of the inside upper right corner, and the at least a portion of the inside upper left corner of the protective battery case.

6. The protective battery case of claim 1, wherein the left side bumper, the right side bumper, and the top side bumper have concave inward facing surfaces.

7. The protective battery case of claim 1, wherein the left side bumper, the right side bumper, and the top side bumper together extend across at least about 50 percent of the side perimeter of the inside of the protective battery case.

8. A protective battery case for use with a mobile electronic device, the protective battery case comprising:
- a first case portion comprising:
  - a battery;
  - a back wall configured to extend across at least a portion of a back of the mobile electronic device;
  - a bottom wall configured to extend along at least a portion of a bottom of the mobile electronic device;
  - an open top side to facilitate insertion of the mobile electronic device into the lower case portion;
  - a device interface configured to electrically couple to a corresponding interface on the mobile electronic device when the mobile electronic device is in the protective battery case, wherein the device interface is electrically coupled to the battery and is configured to deliver electrical power from the battery to the mobile electronic device;
  - a charging interface configured to receive electrical power and electrically coupled to the battery for charging the battery;
- a second case portion configured to removably couple to the first case portion to provide a closed configuration for housing the mobile electronic device, and configured to decouple from the first case portion to provide an open configuration to facilitate insertion of the mobile electronic device into the protective battery case, the second case portion comprising a top wall configured to extend along at least a portion of a top of the mobile electronic device; and
- one or more bumpers disposed at least at a lower right inside corner, a lower left inside corner, an upper right inside corner, and an upper left inside corner of the protective battery case such that the one or more bumpers are configured to abut against at least a lower right corner, a lower left corner, an upper right corner, and an upper left corner of the mobile electronic device;

wherein the one or more bumpers comprise an elastomeric and/or soft material configured to provide impact absorption to protect the mobile electronic device;

wherein the one or more bumpers are not exposed on the outside of the protective battery case when the mobile electronic device is in the protective battery case;

wherein a front opening of the protective battery case is configured such that a display of the mobile electronic device is visible through the front opening.

9. The protective battery case of claim 8, wherein the battery is disposed inside the back wall such that the battery is configured to be behind the back side of the mobile electronic device.

10. The protective battery case of claim 8, wherein the protective battery case is configured to house a smartphone and wherein the protective battery case has an external shape that generally corresponds to an external shape of the smartphone.

11. The protective battery case of claim 8, wherein the one or more bumpers extend across at least about 50 percent of the side perimeter of the inside of the protective battery case.

12. The protective battery case of claim 8, wherein the one or more bumpers comprise an elastomeric material.

13. The protective battery case of claim 8, wherein the one or more bumpers have concave inward facing surfaces.

14. A protective battery case for use with a mobile electronic device, the protective battery case comprising:
- a battery;
- an outer shell comprising:
  - a back wall configured to extend across at least a portion of a back of the mobile electronic device;
  - a bottom wall configured to extend along at least a portion of a bottom of the mobile electronic device;
  - a top wall configured to extend along at least a portion of a top of the mobile electronic device;
  - a right side wall configured to extend along at least a portion of a right side of the mobile electronic device;

a left side wall configured to extend along at least a portion of a left side of the mobile electronic device;

a front opening through which a display of the mobile electronic device is visible when the mobile electronic device is in the protective battery case;

a device interface configured to electrically couple to a corresponding interface on the mobile electronic device when the mobile electronic device is in the protective battery case, wherein the device interface is electrically coupled to the battery and is configured to deliver electrical power from the battery to the mobile electronic device;

a charging interface configured to receive electrical power and electrically coupled to the battery for charging the battery; and one or more bumpers configured to abut against the mobile electronic device when the mobile electronic device is in the protective battery case, the one or more bumpers configured to support the top of the mobile electronic device, the right side of the mobile electronic device, the left side of the mobile electronic device, and the bottom of the mobile electronic device;

wherein the one or more bumpers comprise an elastomeric and/or soft material configured to provide impact absorption to protect the mobile electronic device;

wherein the outer shell completely covers the one or more bumpers.

15. The protective battery case of claim 14, wherein the one or more bumpers have concave inward facing surfaces.

16. The protective battery case of claim 14, wherein the one or more bumpers cover at least a portion of a lower right inside corner, at least a portion of a lower left inside corner, at least a portion of an upper right inside corner, and at least a portion of an upper left inside corner of the protective battery case.

17. The protective battery case of claim 14, wherein the one or more bumpers extend across at least about 50 percent of the side perimeter of the inside of the protective battery case.

18. The protective battery case of claim 14, wherein the one or more bumpers comprise an elastomeric material.

19. The protective battery case of claim 14, wherein the battery is disposed inside the back wall such that the battery is configured to be behind the back side of the mobile electronic device.

20. The protective battery case of claim 14, wherein the protective battery case is configured to house a smartphone and wherein the protective battery case has an external shape that generally corresponds to an external shape of the smartphone.

21. The protective battery case of claim 1, wherein the device interface is positioned in a gap between the left side bumper and the right side bumper such that a line from the portion of the left side bumper at the inside lower left corner to the portion of the right side bumper at the inside lower right corner intersects the device interface.

* * * * *